(12) United States Patent
Roy et al.

(10) Patent No.: US 8,560,293 B2
(45) Date of Patent: Oct. 15, 2013

(54) ENHANCED MATCHING THROUGH EXPLORE/EXPLOIT SCHEMES

(75) Inventors: H. Scott Roy, Palo Alto, CA (US); Raghunath Ramakrishnan, Madison, WI (US); Pradheep Elango, Mountain View, CA (US); Nitin Motgi, Santa Clara, CA (US); Deepak K. Agarwal, Sunnyvale, CA (US); Wei Chu, Sunnyvale, CA (US); Bee-Chung Chen, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/569,728

(22) Filed: Aug. 8, 2012

(65) Prior Publication Data

US 2012/0303349 A1    Nov. 29, 2012

Related U.S. Application Data

(63) Continuation of application No. 12/267,534, filed on Nov. 7, 2008, now Pat. No. 8,244,517.

(51) Int. Cl.
  *G06F 17/50*        (2006.01)
(52) U.S. Cl.
  USPC .......................................................... 703/13
(58) Field of Classification Search
  USPC ......... 703/13; 706/47; 707/803, 723; 705/10, 705/14, 8, 14.4, 14.42; 725/146; 455/414.1; 709/226, 200; 715/808, 530
  See application file for complete search history.

(56) References Cited

U.S. PATENT DOCUMENTS

| | | |
|---|---|---|
| 5,446,891 A | 8/1995 | Kaplan et al. |
| 5,727,129 A | 3/1998 | Barrett et al. |
| 5,754,938 A | 5/1998 | Herz et al. |
| 5,754,939 A | 5/1998 | Herz et al. |
| 5,761,662 A | 6/1998 | Dasan |
| 5,835,087 A | 11/1998 | Herz et al. |
| 5,890,152 A | 3/1999 | Rapaport et al. |
| 5,918,014 A | 6/1999 | Robinson |
| 5,937,397 A | 8/1999 | Callaghan |
| 6,029,195 A | 2/2000 | Herz |

(Continued)

OTHER PUBLICATIONS

DeGroot, M., "Optimal Statistical Decisions" McGraw-Hill, Inc. (1970) Chapter 14: "Sequential Choice of Experiments" (34 pages).

(Continued)

*Primary Examiner* — Kandasamy Thangavelu
(74) *Attorney, Agent, or Firm* — Hickman Palermo Truong Becker Bingham Wong LLP

(57) ABSTRACT

Content items are selected to be displayed on a portal page in such a way as to maximize a performance metric such as click-through rate. Problems relating to content selection are addressed, such as changing content pool, variable performance metric, and delay in receiving feedback on an item once the item has been displayed to a user. An adaptation of priority-based schemes for the multi-armed bandit problem, are used to project future trends of data. The adaptation introduces experiments concerning a future time period into the calculation, which increases the set of data on which to solve the multi-armed bandit problem. Also, a Bayesian explore/exploit method is formulated as an optimization problem that addresses all of the issues of content item selection for a portal page. This optimization problem is modified by Lagrange relaxation and normal approximation, which allow computation of the optimization problem in real time.

18 Claims, 10 Drawing Sheets

(56) References Cited

U.S. PATENT DOCUMENTS

| | | | |
|---|---|---|---|
| 6,092,049 A | 7/2000 | Chislenko et al. | |
| 6,134,532 A | 10/2000 | Lazarus et al. | |
| 6,202,058 B1 | 3/2001 | Rose et al. | |
| 6,438,579 B1 | 8/2002 | Hosken | |
| 6,591,248 B1 | 7/2003 | Nakamura et al. | |
| 6,665,653 B1* | 12/2003 | Heckerman et al. | 706/47 |
| 6,728,706 B2 | 4/2004 | Aggarwal et al. | |
| 7,050,992 B1 | 5/2006 | Bowman et al. | |
| 7,472,102 B1* | 12/2008 | Heckerman et al. | 706/47 |
| 7,478,035 B1 | 1/2009 | Wrench et al. | |
| 7,739,280 B2 | 6/2010 | Aravamudan et al. | |
| 7,801,891 B2 | 9/2010 | Hu et al. | |
| 7,835,998 B2 | 11/2010 | Aravamudan et al. | |
| 7,885,904 B2 | 2/2011 | Aravamudan et al. | |
| 7,970,762 B2 | 6/2011 | Goronzy et al. | |
| 7,984,004 B2 | 7/2011 | Andrew et al. | |
| 8,005,833 B2 | 8/2011 | Adar et al. | |
| 8,037,067 B1 | 10/2011 | Schnedler et al. | |
| 8,055,663 B2 | 11/2011 | Tsai et al. | |
| 8,301,623 B2* | 10/2012 | Chakrabarti et al. | 707/723 |
| 8,316,020 B1 | 11/2012 | Kleinmann | |
| 2002/0062247 A1* | 5/2002 | Allen | 705/14 |
| 2003/0061239 A1 | 3/2003 | Yoon | |
| 2003/0110181 A1 | 6/2003 | Schetze et al. | |
| 2005/0235030 A1* | 10/2005 | Lauckhart et al. | 709/200 |
| 2006/0053065 A1 | 3/2006 | Bowman et al. | |
| 2006/0129926 A1* | 6/2006 | Malek et al. | 715/530 |
| 2006/0149710 A1 | 7/2006 | Koningstein et al. | |
| 2007/0198339 A1* | 8/2007 | Shen et al. | 705/14 |
| 2007/0250901 A1* | 10/2007 | McIntire et al. | 725/146 |
| 2007/0260624 A1 | 11/2007 | Chung et al. | |
| 2007/0266025 A1 | 11/2007 | Wagner et al. | |
| 2008/0097829 A1* | 4/2008 | Ritter | 705/10 |
| 2008/0162699 A1* | 7/2008 | Gaffney | 709/226 |
| 2008/0249832 A1* | 10/2008 | Richardson et al. | 705/10 |
| 2008/0290987 A1* | 11/2008 | Li | 340/5.1 |
| 2008/0305781 A1* | 12/2008 | Wilson et al. | 455/414.1 |
| 2009/0037410 A1 | 2/2009 | Jones et al. | |
| 2009/0138326 A1 | 5/2009 | Shi | |
| 2009/0171728 A1* | 7/2009 | Yan et al. | 705/8 |
| 2009/0171763 A1 | 7/2009 | Doug et al. | |
| 2009/0187515 A1 | 7/2009 | Andrew et al. | |
| 2009/0259969 A1* | 10/2009 | Pallakoff | 715/808 |
| 2009/0265230 A1 | 10/2009 | Ciaramita et al. | |
| 2009/0299945 A1 | 12/2009 | Hangartner | |
| 2010/0030717 A1 | 2/2010 | Agarwal et al. | |
| 2010/0036703 A1* | 2/2010 | Chen et al. | 705/8 |
| 2010/0082413 A1* | 4/2010 | Huberman et al. | 705/14.4 |
| 2010/0100419 A1* | 4/2010 | Natoli et al. | 705/10 |
| 2010/0106594 A1 | 4/2010 | Song et al. | |
| 2010/0121801 A1 | 5/2010 | Roy et al. | |
| 2010/0138452 A1* | 6/2010 | Henkin et al. | 707/803 |
| 2010/0241507 A1* | 9/2010 | Quinn et al. | 705/14.42 |
| 2010/0241625 A1 | 9/2010 | Aravamudan et al. | |
| 2010/0293160 A1 | 11/2010 | Aravamudan et al. | |
| 2011/0016121 A1 | 1/2011 | Sambrani | |
| 2011/0055209 A1 | 3/2011 | Novac et al. | |

OTHER PUBLICATIONS

Caro, F. et al., "Dynamic Assortment with Demand Learning for Seasonal Consumer Goods" *Management Science* (Feb. 2007) pp. 276-292.

Gittins, J.C., "Bandit Processes and Dynamic Allocation Indices" *Journal of the Royal Statistical Society* (1979) pp. 148-177.

Glazebrook, K.D. et al., "On the Optimal Allocation of Service to Impatient Tasks" *Journal of Applied Probability* (2004) pp. 51-72.

Hauser, J.R. et al., "Website Morphing" *Forthcoming Marketing Science* (May 2008) 39 pages.

Koulouriotis, D.E. et al., "Reinforcement learning and evolutionary algorithms for non-stationary multi-armed bandit problems" *Elsevier Inc.* (2007) pp. 913-922.

Langford, J. et al., "The Epoch-Greedy Algorithm for Contextual Multi-armed Bandits" (2008) 8 pages.

Pandey, S. et al., "Bandits for Taxonomies: a Model-based Approach" (Jan. 2007) 12 pages.

Pandey, S. et al., "Multi-armed Bandit Problems with Dependent Arms" *Proceedings of the 24th International Conference* (2007) 8 pages.

Pavlidis, N. et al., "Simulation studies of Multi-Armed Bandits with Covariates (Invited Paper)" IEEE (2008) pp. 493-498.

Radinski, F. et al., "Active Exploration for Learning Rankings from Clickthrough Data" ACM (2007) 10 pages.

Sarkar, J., "One-Armed Bandit Problems with Covariates" *The Annals of Statistics* (Dec. 1991) pp. 1978-2002.

Slivkins, A. et al., "Adapting to a Changing Environment: the Brownian Restless Bandits" (2008) 12 pages.

Vermorel, J. et al., "Multi-Armed Bandit Algorithms and Empirical Evaluation" Courant Institute of Mathematical Sciences (2005) 12 pages.

Wang, C. et al., "Bandit Problems with Side Observations" IEEE (May 2005) 16 pages.

West, M. et al, "Springer Series in Statistics" Bayesian Forecasting and Dynamic Models, *Springer-Verlag* (1997) Chapter 16: "Multivariate Modelling and Forecasting" (30 pages).

Whittle, P., "Restless Bandits: Activity Allocation in a Changing World" *Journal of Applied Probability* (1988) pp. 287-298.

Yang, Y. et al., "Randomized Allocation with Nonparametric Estimation for a Multi-Armed Bandit Problem with Covariates" *The Annals of Statistics* (Feb. 2002) pp. 100-121.

International Searching Authority, International Search Report for PCT application No. PCT/US2010/041960 with written opinion, dated Feb. 18, 2011, 9 pgs.

Current claims for PCT application No. PCT/US2010/041960, 4 pgs.

Amiri Ali et al. "Scheduling Web Banner Advertisements With Multiple Display Frequencies", Systems, Man and Cybernetics, Part A: Systems and Humans, IEEE Transactions on, vol. 36, No. 2, 7 pages, dated Mar. 2006.

* cited by examiner

ENHANCED MATCHING THROUGH EXPLORE/EXPLOIT SCHEMES

CROSS REFERENCE TO RELATED APPLICATIONS; PRIORITY CLAIM

This application claims benefit as a Continuation, under 35 U.S.C. §120, of U.S. patent application Ser. No. 12/267,534, titled ENHANCED MATCHING THROUGH EXPLORE/ EXPLOIT SCHEMES and filed on Nov. 7, 2008, now U.S. Pat. No. 8,244,517 the entire contents of which are hereby incorporated by reference as if fully set forth herein. The applicant hereby rescinds any disclaimer of claim scope in the parent application or the prosecution history thereof and advise the USPTO that the claims in this application may be broader than any claim in the parent application.

This application is related to U.S. patent application Ser. No. 12/267,538, titled ENHANCED MATCHING THROUGH EXPLORE/EXPLOIT SCHEMES, and filed on Nov. 7, 2008, and is also related to U.S. patent application Ser. No. 12/504,527, titled ACTIVITY BASED USERS' INTERESTS MODELING FOR DETERMINING CONTENT RELEVANCE, and filed on Jul. 16, 2009, the entire contents of all of which are hereby incorporated by reference as if fully set forth herein.

FIELD OF THE INVENTION

The present invention relates to Internet portal web pages, and, more specifically, to techniques for employing targeted experiments to select content items to be displayed on an Internet portal web page.

BACKGROUND

Owners of portal web pages wish to make their pages appealing to potential visitors. One way of making a portal page more enticing to those potential visitors is by placing interesting information on that portal page. For example, one might try to entice users to access a portal page by including, on the portal page, interesting and current content items such as news stories, advertisements, pertinent search results, or media. Such content items may be presented in conjunction with one another, or separately. Furthermore, there may be a substantive representation of the content item directly on the portal page, or the portal page may contain only a link with minimal information about the item.

If visitors to the portal page learn, by experience, that the content shown on the portal page is likely to be of interest to those visitors, and that the content shown on the portal page is likely to be dynamic, updated, fresh, and current each time that those visitors access the portal page, then those visitors will likely want to access that page additional times in the future, and with greater frequency. Also, the dynamic nature of the portal page will enhance the experience of the visitors.

Alternatively, if visitors to the portal page discover, by experience, that the content shown on the portal page is likely to be the same static content that those visitors saw the last time that they visited the portal page, or if visitors to the portal page come to understand that the type of content that is shown on the portal page is a type of content in which they are not interested, then those visitors become more likely, in the future, to forego visiting the portal page and visit other pages instead.

One challenge to the owner or the maintainer of the portal page becomes how to choose, from among the multitude of content that could be presented on the portal page, content that is likely to increase visitor interest in the page. One approach for selecting content might involve hiring a staff of full-time human editors to look for (and/or compile or otherwise produce) news stories and other content items that those editors believe will be interesting to those who visit the portal page. However, such editors are only human, and, as humans, are inherently biased towards their own tastes and preferences. The content that appeals to the editors might not be content that appeals to significant segments of the public. Additionally, a staff of qualified full-time editors can require a significant and recurring monetary investment on the part of the owners of the Internet portal page to maintain or to scale.

Another approach for selecting content for presentation on the portal page is through an automated system. These automated systems are easier to scale and maintain than the staff of editors. The systems generally base content selection on historical information gathered from users of the portal page. For example, automated systems can rely on past user behavior including search queries that were previously entered, advertisements that visitors have clicked on, or information that visitors explicitly give to the portal page. However, such historical data does not always accurately reflect the current trends and desires of the visitors to the portal page. Also, because content for web pages can change very rapidly, the historical data may not include information about the content currently available to display.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Visitor interest in a portal page—measured by performance metrics such as overall visitor experience, number of page views, and click-through rate—dictates the amount of advertising revenue that will be generated by the portal page. For simplicity, the following discussion will focus on click-through rate as the pertinent performance metric, but a person of skill in the art will appreciate that any yield function could be used as the performance metric. Click-through rate is also known as CTR, and is defined in one embodiment of the invention as a number of clicks on a particular content item divided by a number of times the particular content item has been displayed to users of the portal page.

In one embodiment of the invention, an automated system is used to select and present to users those items in the content pool that will most likely have a high CTR. In another embodiment of the invention, the automated system bases selection of content items for presentation on both historical data and hypothetical data produced by experiments. As previously stated, historical data alone does not reflect changing CTR, and the historical data does not contain information about newly available items. Also, historical data is generally sparse because the number of clicks observed for the items in the content pool is generally low compared to the number of times the items have been presented. Thus, decisions made by the system based on solely historical data cannot account for items of content that would perform very well, but that do not conform to the historical trends.

Thus, experiments based on observed user behavior are employed to investigate changing CTR, the effects of a dynamic content pool, and to find those outlier content items that perform unexpectedly well. These experiments are targeted in such a way as to minimize potential hazards of running experiments on live users, such as lowering user experience and depressing CTR. Through the use of targeted experiments, more information is gathered than would be available by using the historical data alone, and thus items with high CTR will be found more quickly.

Other features that may be included in various different embodiments of the invention are discussed in more detail below.

Example System

Figure 1:
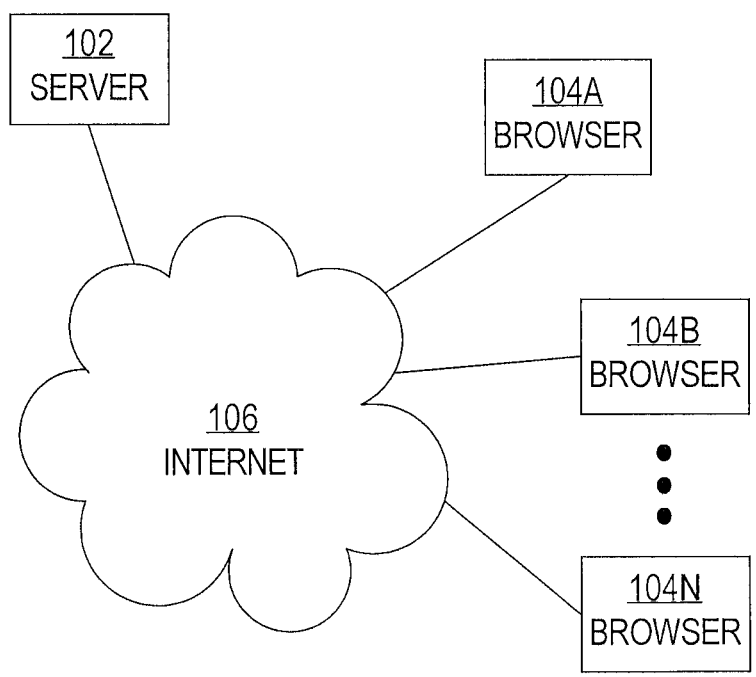
FIG. 1 is a block diagram that illustrates an example of a system in which embodiments of the invention may be implemented and practiced.

FIG. 1 is a block diagram that illustrates an example of a system in which embodiments of the invention may be implemented and practiced. The system of FIG. 1 comprises a server 102, browsers 104A-N, and Internet 106. Alternative embodiments of the invention may include more, fewer, or different components than those illustrated in FIG. 1.

In one embodiment of the invention, browsers 104A-N execute on separate computers, such as desktop or laptop computers. However, in one embodiment of the invention, one or more of browsers 104A-N executes on a mobile device such as a mobile or cellular telephone.

Each of browsers 104A-N communicates with server 102 via Internet 106. For example, browsers 104A-N may send Hypertext Transfer Protocol (HTTP) requests to, and receive HTTP responses from, server 102 across Internet 106. These HTTP requests and responses may be transmitted according to a multi-level suite of network communication protocols, typically including Transfer Control Protocol (TCP) and Internet Protocol (IP). Each of browsers 104A-N may be used by a different user. Browsers 104A-N may be widely distributed over the entire Earth. Using browsers 104A-N, users of browsers 104A-N specify the URL that is associated with a web page (e.g., the portal web page discussed above) that server 102 stores or dynamically generates. In response to these users specifying the URL, browsers 104A-N request, over Internet 106, from server 102, the web page that is associated with that URL. Server 102 receives these requests and dynamically generates and sends the requested web page to browsers 104A-N over Internet 106 in response.

In one embodiment of the invention, users of browsers 104A-N use browsers 104A-N to access a portal web page that is served by server 102. In one embodiment of the invention, server 102 is, or comprises, a web server. In one embodiment of the invention, the functionality of server 102 is provided instead by multiple separate servers to which the requests of browsers 104A-N are distributed by a load-balancing device that receives those requests. In response to requests from browsers 104A-N for the portal web page, server 102 sends the portal web page over Internet 106 to browsers 104A-N. As discussed above, the portal web page typically contains one or more content items that were selected from a pool of available content items. In response to receiving the portal web page from server 102, browsers 104A-N display the portal web page.

In one embodiment of the invention, server 102 dynamically generates at least portions of the portal web page in response to each request from browsers 104A-N. In one embodiment of the invention, the version of the portal web page that server 102 sends to various ones of browsers 104A-N differs from the version that server 102 sends to other ones of browsers 104A-N. For example, the version of the portal web page sent to browser 104A might contain different selected content items than the version of the portal web page sent to browser 104B.

The Multi-Armed Bandit Problem

In one embodiment of the invention, a Bayesian explore/exploit solution is used as the content selection algorithm for the automated system. The algorithm is related to the classical multi-armed bandit problem, which is based on a slot machine with more than one arm. Each arm of the slot machine returns a reward of varying magnitude and each time the hypothetical player pulls an arm of the slot machine, the player must pay a set price. Once the player has pulled at least one arm, she examines the reward she has received from all of her past pulls, as well as the price the player has already paid and uses this information to decide which arm to pull next. The solution to the multi-armed bandit problem is a sequence in which to pull the arms of the slot machine that optimizes payout to the player.

This multi-armed bandit problem is similar to the problem of selecting content items to display on a portal page. There is an array of content items from which to select for display and, for each available spot on the page, one item is chosen to display. When a particular item is selected, the opportunity to display a different item is foregone, and thus each item selection comes with a set price. Choice of a particular item will produce a CTR of unknown magnitude. Thus, solutions to the multi-armed bandit problem are applicable to aid in selecting the order in which to present content items such that the order optimally converges to the highest possible payout. In the case of the portal page, the payout that is maximized is the click-through rate.

There are also some differences between the multi-armed bandit problem and the problem of content item selection for a portal page. The multi-armed bandit problem assumes immediate knowledge of the magnitude of the reward received by the player once an arm has been chosen and pulled. Thus, the decision of which arm to pull is based on all of the feedback from all of the previous pulls performed by the player. The assumption that all feedback will be available at every point of decision is not feasible in the case of presenting content items to visitors of a portal page because a visitor of the page, when presented with a content item, might not immediately click on the item. The visitor may do any number of things after viewing the content item, before deciding finally to click on the content item presented. Thus, one cannot assume that if a viewer does not click on a content item immediately, the viewer will never click on the content item. Also, in the case of a very large portal page, some time may be needed to gather and assemble information regarding the CTR.

Another difference between the problem of content selection and the multi-armed bandit problem is that the multi-armed bandit problem assumes a fixed set of arms available to be chosen. However, the set of content items available to be displayed on a portal page can change almost constantly.

Finally, the multi-armed bandit problem generally assumes that the magnitude of the reward for each arm is static. However, in the case of serving content items on a portal page, the CTR of an item may vary widely from day to day. For example, a content item about a movie that is to be released tomorrow could be very popular presently, but may lose its popularity overnight if it is a box-office flop.

Thus, in one embodiment of the invention, solutions to the multi-armed bandit problem are modified to address the particular issues of the content selection problem. In another embodiment of the invention, a new Bayesian explore/exploit algorithm is used to address these issues.

Modification of Priority-Based Solutions to the Multi-Armed Bandit Problem

An embodiment of the invention is described below wherein the solution to the traditional multi-armed bandit algorithm is modified to include an experiment to produce hypothetical data pertaining to a future time period. Based on this modified solution, a plan is formulated for selecting content items to be served during the future time period that are most likely to maximize the CTR of the portal page.

The experiment includes identifying a set future time interval and hypothetically serving content items to hypothetical users that are assumed to visit the portal page during the future time interval. The number of visitors to the page during a particular period of time is estimated from historical data. For each hypothetical presentation of a content item, the expected click-through rate of the item and the number of times the item was hypothetically served is recorded in an experiment database. The definition of the expected click-through rate for an item used for the experiment is an empirical estimate based on the true historical data regarding the item. When the experiment is complete, the data from the experiment database is used to create a plan for serving the available content items to actual portal page visitors during the set time period.

In one embodiment of the invention, as information is gathered pertaining to the content items presented to actual users during the set time period, the true historical database is updated with the data gathered from the true user reactions. Then the experiment is run again to produce an updated plan for a new future time period. Thus, the data from the experiment is used in conjunction with the historical data to provide a larger set of data on which to base the selection of the content items than would be available if content items were selected based on the available historical data alone. In another embodiment of the invention, experiments regarding future time periods are run continuously while information is gathered pertaining to content items presented to actual users of the portal page. In this embodiment of the invention, the future time period is not set, but is constantly moving so as to provide an updated corpus of projected future data at all times.

The following is a more detailed discussion of one embodiment of the invention. In order to simplify this discussion, the subject portal page is assumed to have N content items available to display and the capacity to display only a single content item at a time. A particular item i has a current estimated probability, $\hat{P}_i$, that a random user will click on the item. In one embodiment of the invention, $\hat{P}_i$ is estimated by dividing the total number of clicks observed for item i by the total number of times item i has been shown to users. In another embodiment of the invention, $\hat{P}_i$ uses both historical data and simulated data. One of skill in the art will appreciate that there are other ways to calculate $\hat{P}_i$. Thus, if item i is served K times, $K \cdot \hat{P}_i$ clicks on item i are expected.

A true historical database D holds the historical data pertaining to each of the N content items, including the number of times each item has been actually presented to users and the number of clicks that have been observed for each item. Historical database D is the basis for the experiment that produces the simulated data. In one embodiment of the invention, a priority function uses D to select which item to present hypothetically to hypothetical visitors during the set future time period, t. For each item in N, the priority function, $f$, receives the historical data pertinent to an item i, denoted $D_i$, and outputs a number rank pertaining to item i based on that data. In one embodiment, the priority function is as follows:

$$f(D_i) = \hat{P}_i + V(D_i)$$

Figure 2A:
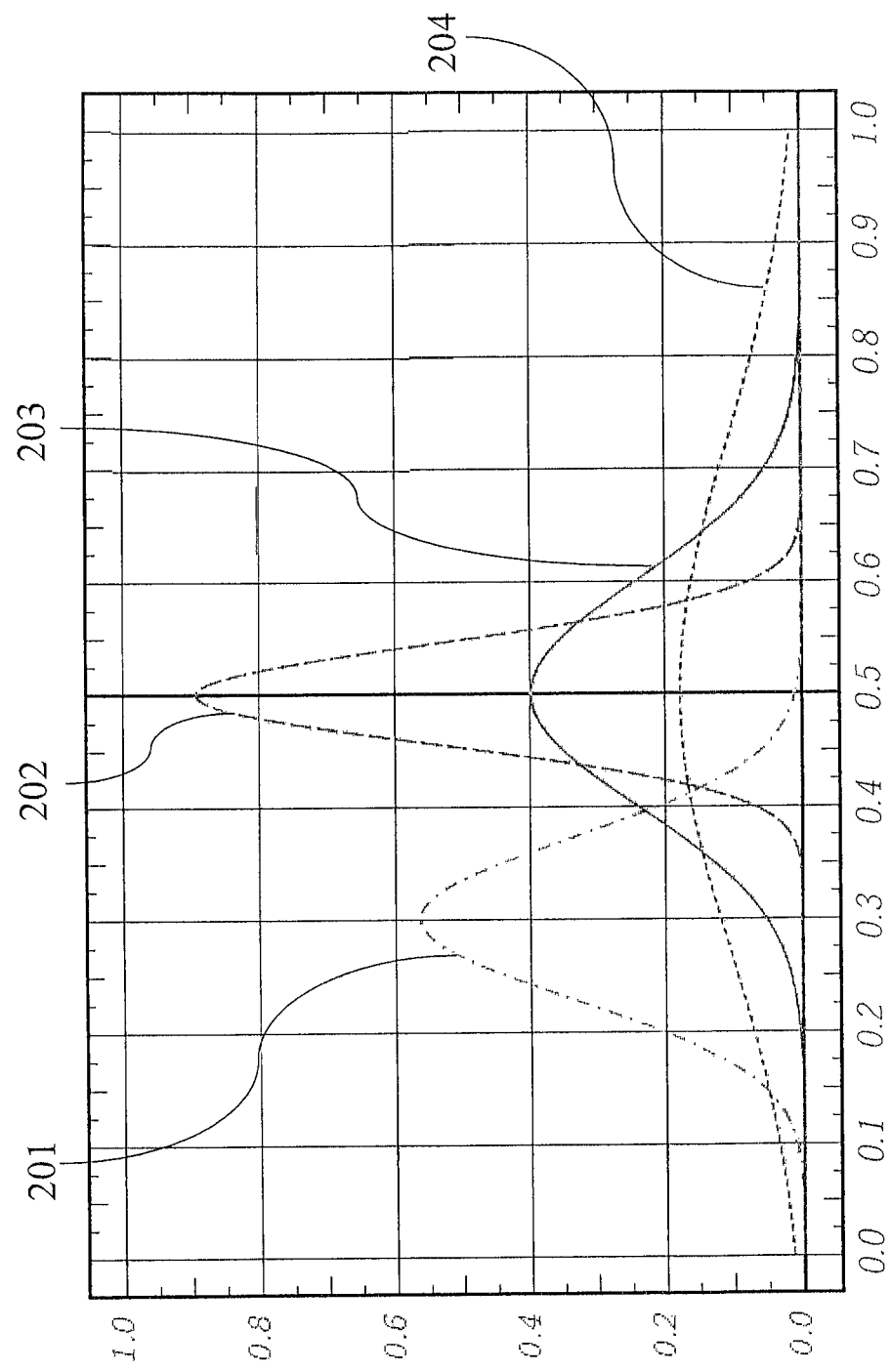
FIGS. 2A-2D are diagrams that illustrate an example of a set of standard normal distribution graphs approximating probability distributions
Figure 2B:
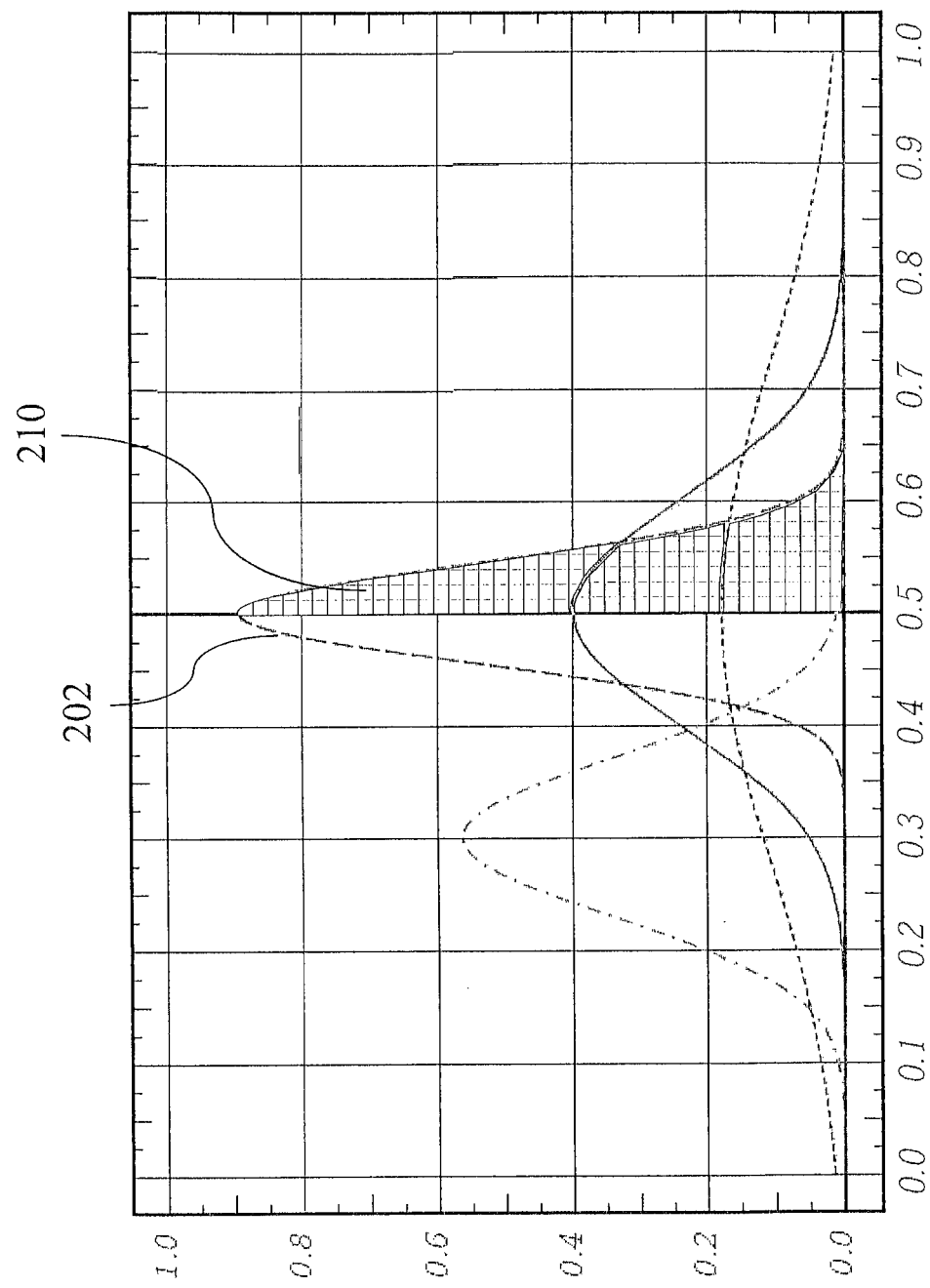
Figure 2C:
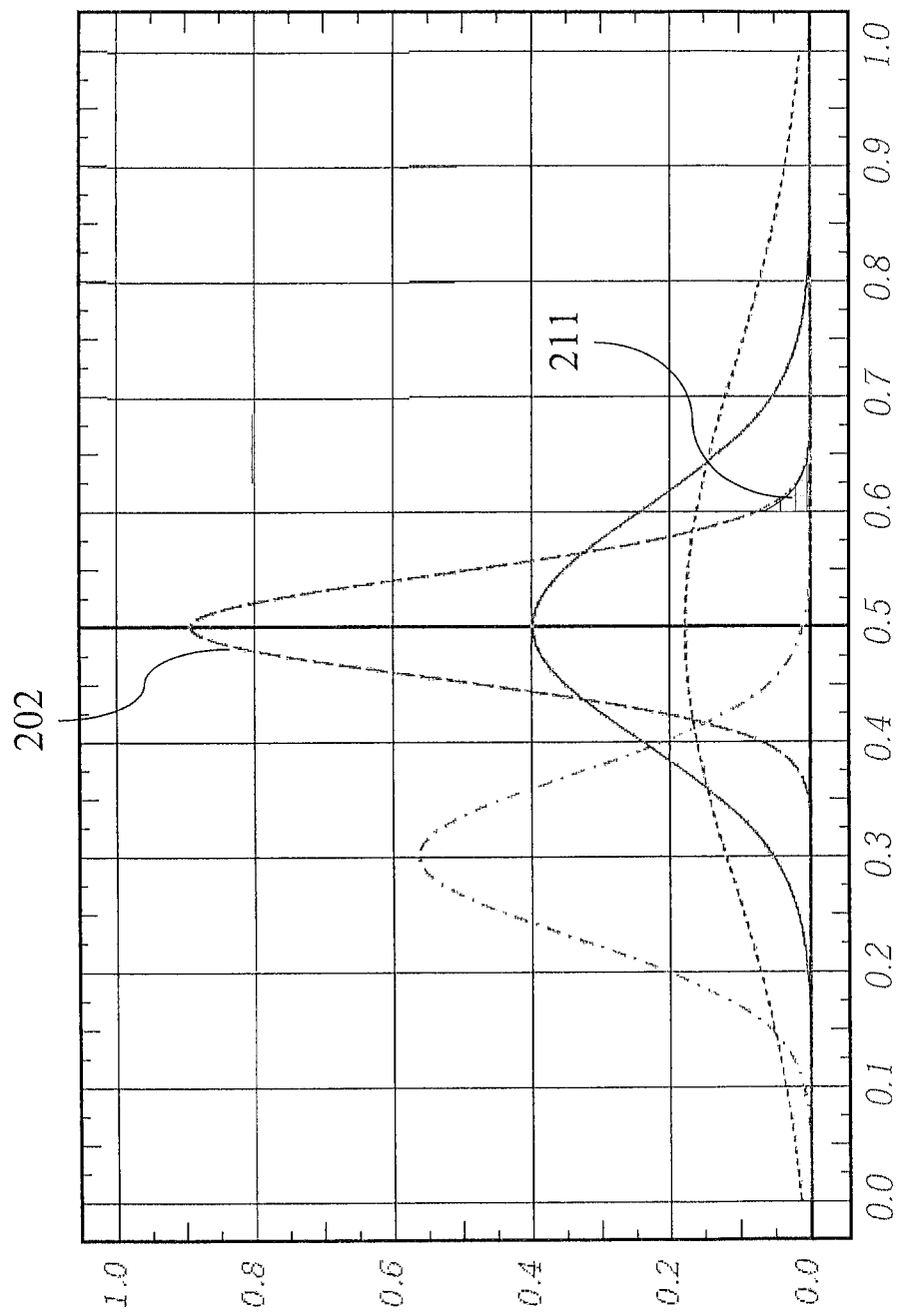
Figure 2D:
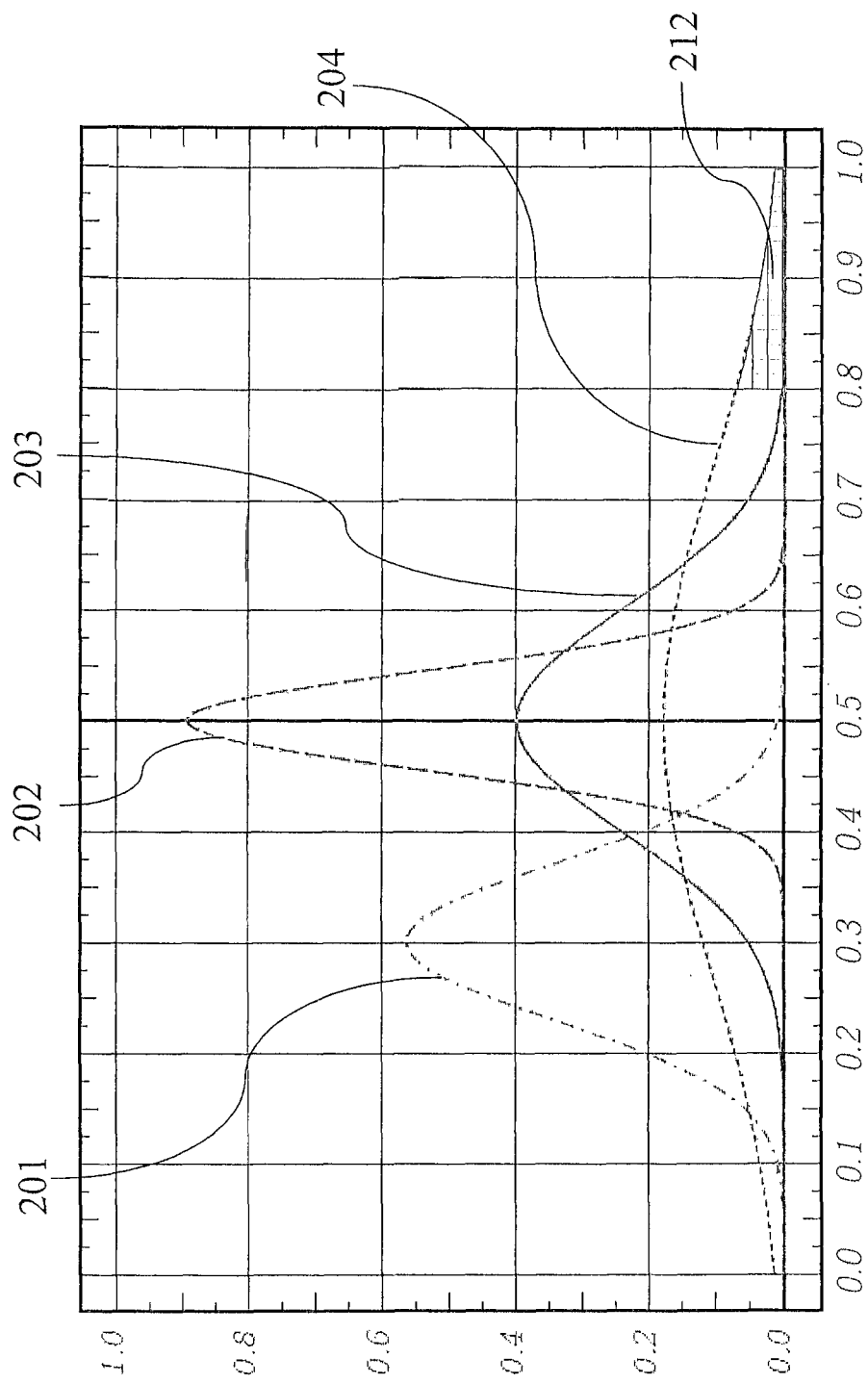

Thus, the priority of item i is calculated by adding its current estimated click-through rate, $\hat{P}_i$, with $V(D_i)$, which is a variance calculation. For example, a quantity that intuitively represents variance is $$\sqrt{\frac{2 \ln n}{n_i}},$$

where n denotes the total number of page views served so far and $n_i$ represents the number of pages given to item i so far. $V(D_i)$ represents an empirical estimate of the potential for the CTR of item i to improve. As a demonstration of why the variance should be considered, in FIG. 2A, probability distributions 201, 202, 203, and 204 are graphs approximating statistical models on which the variance for a particular item could be based. Specifically, FIG. 2B illustrates that probability distribution 202 indicates, at area 210, a 50% probability that the item corresponding to probability distribution 202 will achieve a CTR greater than 0.5. Also, FIG. 2C illustrates, at section 211, a 5% probability that the item corresponding to probability distribution 202 will achieve a CTR greater than 0.6. Because the probability function $f$ involves both $\hat{P}_i$ and $V(D_1)$, the function takes into account the present estimated click-through rate and the probability that a click-through rate will improve in the future.

Figure 3:
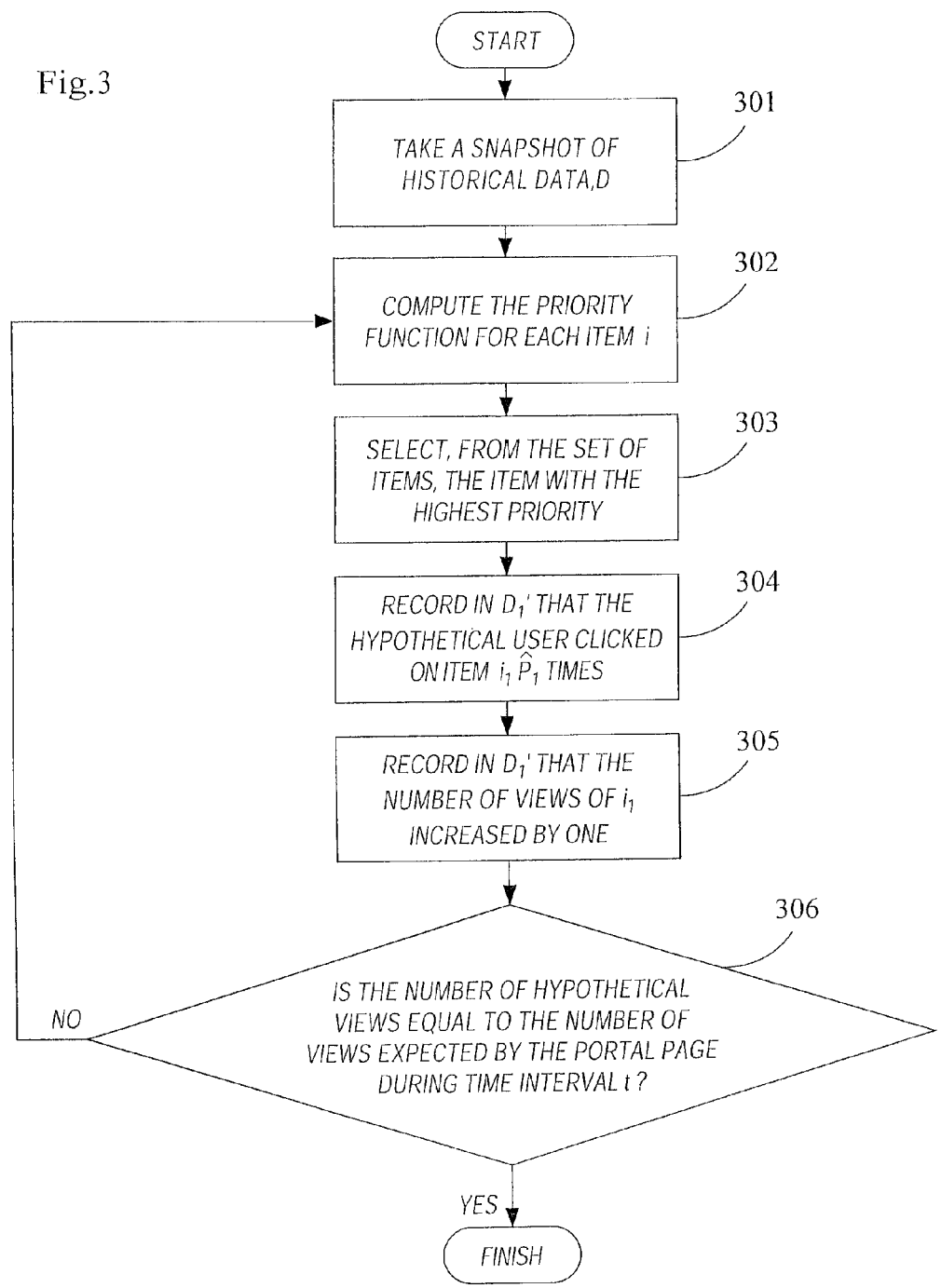
FIG. 3 is a flowchart that illustrates an example process of simulating user behavior pertaining to a specified future time period, according to an embodiment of the invention.

In one embodiment of the invention shown in FIG. 3, the first step 301 in deciding what to show for each visit in the designated future time period, t, is to take a snapshot of the entire set of historical data, D. Next, in step 302, the priority for each item is computed using the priority function, $f$, as well as the historical data for each item i, $D_i$ and the experiment data gathered to this point for each item i, $D_i'$. The priority function is evaluated as $f$(union of $D_i$ and $D_i'$). In the case of the first item to be selected, the set of experiment data will be empty. In step 303, the item with the highest priority score, denoted $i_1$, is selected to be hypothetically served to a hypothetical user in the experiment. The hypothetical data set for item $i_1$, $D'_1$, is updated to reflect the hypothetical selection of item $i_1$. This update records the following: (1) that the hypothetical user clicked on item $i_1$ a fraction of times, equal to $P_1$, at step 304, and (2) the number of views of item $i_1$ has increased by one, at step 305.

After the hypothetical data set $D'_1$ is updated, the simulation process repeats itself starting from step 302 until the number of hypothetical views by the simulation reaches the number of views that is expected at the portal page during time interval t, as illustrated in decision 306.

The above-described technique amounts to a simulation of user behavior for the future time period t. In one embodiment of the invention, the percentage of times each item was hypothetically served is used as a sampling plan. The content items are presented to users during the designated time period, t, based on the percentage corresponding to each item in the sampling plan.

For a non-limiting example of creating a sampling plan, the result of a particular experiment regarding a particular time interval is that item $i_1$ was presented hypothetically to hypothetical users two times out of ten, or 20% of the time, and item $i_2$ was presented hypothetically to hypothetical users eight times out of ten, or 80% of the time. For the purposes of the experiment, the subject time interval is a future time interval. However, when the sampling plan—created as a result of the experiment—is put into practice, the subject time interval is the present time. Thus, the plan created from the particular experiment indicates that item $i_1$ is to be presented to actual users 20% of the time during the subject time interval and that item $i_2$ is to be presented to actual users 80% of the time.

A more detailed discussion of the modification of priority-based solutions to the multi-armed bandit problem is located in Section 4 of Appendix A.

Bayesian Solution

In another embodiment of the invention, the problem of selecting content for a portal page such that the CTR is maximized can be put into a Bayesian formula for which the optimal solution can be found. Again, this discussion focuses on CTR as the pertinent performance metric, but performance can be measured in other ways. This equation takes into account a changing content pool, a shifting CTR for each content item, and the delay between presenting a particular content item to a user and receiving feedback regarding the success of the particular content item. However, the solution for such an equation is calculation-intensive. Therefore, Lagrange relaxation and normal approximation are implemented in one embodiment of the invention to allow for calculation of a near-optimal solution of the equation in real time.

Each item in the content pool is associated with a probability distribution (for example, probability distributions 201-204 in FIG. 2A) measuring the potential for the CTR associated with the item to increase or decrease. As an illustration, probability distribution 201 represents an approximation of the probability distribution associated with item $i_1$, and probability distribution 202 represents an approximation of the probability distribution associated with item $i_2$.

The probability distribution associated with each item indicates the probability that an item will get a better or a worse click-through rate than that item's current CTR if the item continues to be served to users. Because the goal is to maximize the total click-through rate, focus is placed on the possibility of obtaining a better click-through rate as opposed to the possibility of producing a worse click-through rate. If, for example, item $i_2$ has a current estimated click-through rate of 0.5 (indicating that out of 10 views, item $i_2$ has been clicked on an average of 5 times), probability distribution 202 can be used to estimate the chance that users will click on item $i_2$ more often than 5 out of 10 times if the item continues to be presented to users. Probability distribution 202 shows a 50% chance that the click-through rate of item $i_2$ will improve from 0.5, as shown in FIG. 2B as an area 210 under the probability distribution 202.

Of particular interest is the area under the curve to the extreme right, known as the tail area, where the gain in click-through rate is potentially the greatest. This tail area is used herein for explanation purposes only; the Bayesian solution does not use or calculate the tail area. An example of a tail area is indicated in FIG. 2C by an area 211, which shows a probability of 5% that the click-through rate for item $i_2$, which is associated with probability distribution 202, could be higher than 0.6. Given a goal of maximizing the total CTR, the optimization problems discussed in the cases hereafter explore the possibility of a given item performing in the range of the tail area of that item's distribution, especially if the range of that tail area is better than the item with the best known click-through rate.

In one embodiment of the invention, the possibility that the other item will produce a higher CTR than the item with the current-best CTR is tested by serving the other item to users and monitoring the actual click-through rate of the other item. As more is known about the actual click-through rate of the other item, the probability distribution associated with the item changes, converging on a single CTR number. As the probability distribution converges, the tails area of the probability distribution gets smaller. If, as more information is gained about the items in the content pool, the probability distributions indicate that there is no longer a significant possibility that the other item will produce a higher CTR than the best known item's CTR, then the other item is no longer served. Conversely, if the other item continues to have a significant enough probability of producing a better CTR than the best known CTR, then the other item will continue to be presented to users.

In this manner, experiments are performed to get more information about the click-through rates of items with the potential to have very high click-through rates, to explore, for each item, the possibility that the item's click-through rate will improve. However, once the probability distribution indicates a poor probability of a particular item achieving a high click-through rate, the experiment with respect to the particular item is over.

Single-Interval Case

The simplest problem setting in which to describe the Bayesian equation is one in which only one time interval is considered, called time interval 1. The goal is to determine the fraction of times that each available item is selected for presentation to users during time interval 1, which fraction is denoted by $x_{i,1}$ for each item i, such that the total number of clicks in time interval 1 is maximized. In this scenario, the maximum number of clicks is obtained by assigning 100% of the page views to the item with the highest expected CTR.

Bayes 2×2 Case: Two Items, Two Intervals

A slightly more involved scenario is one in which two items are available to display to the user and two time intervals, $T_0$ and $T_1$, are remaining. In order to further simplify the scenario, the CTR of the first item is exactly known without uncertainty. The known and certain CTR of the first item is denoted by $q_0$ and $q_1$, in time intervals $T_0$ and $T_1$, respectively, as indicated by the subscripts of the respective variables. The uncertain CTR of the second item is denoted by $p_0 \sim P(\theta_0)$ and $p_1 \sim P(\theta_1)$ in time intervals $T_0$ and $T_1$, respectively. $P(\theta_1)$ is a posterior distribution of $p_t$ and $\theta_t$ is a vector representing the hyperparameter or state of the distribution. The vector represented by $\theta_0$ is a known quantity, while the vector represented by $\theta_1$ is random because it is a function of a random number of clicks obtained in interval 0. Furthermore, $N_0$ and $N_1$ denote the number of respective page views for each time interval and x and $x_1$ denote the fraction of page views to be given to the uncertain item. The quantities $(1-x)$ and $(1-x_1)$ are the fractions to be given to the certain item. The variable c denotes a random variable representing the number of clicks that the uncertain item gets in time interval 0. Finally, $\hat{p}_0 = E[p_0]$ and $\hat{P}_1(x,c) = E[p_1|x,c]$.

The value of $x_1$ depends on x and c. To emphasize that $x_1$ is a function of x and c, $x_1$ is at times expressed as $0 \le x_1(x,c) \le 1$. Let $X_1$ denote the domain of $x_1$, which is the set of all possible such functions that return a number between 0 and 1 for given (x,c). The goal is to find $x \in [0,1]$ and $x_1 \in X_1$ that maximize the expected total number of clicks in the two time intervals, which maximization problem is denoted by:

$$E[N_0(xp_0 + (1-x)q_0) + N_1(x_1p_1 + (1-x_1)q_1)] = \quad \text{Eq. 1}$$
$$E[N_0x(p_0 - q_0) + N_1x_1(p_1 - q_1)] + q_0N_0 + q_1N_1.$$

Since $q_0N_0$ and $q_1N_1$ are constants, only the expectation term, $E[N_0x(p_0-q_0) + N_1x_1(p_1-q_1)]$, needs to be maximized. Therefore, like in the previous scenario, the goal is to determine the fraction of times to display each item such that the total number of clicks is maximized. In other words, x and $x_1$ must be determined such that the following equation is maximized:

$$\text{Gain}(x, x_1) = E[N_0x(p_0 - q_0) + N_1x_1(p_1 - q_1)], \quad \text{Eq. 2}$$

which is the difference in the number of clicks between: (a) a scheme that shows the uncertain item for $xN_0$ times in interval 0 and $x_1N_1$ times in interval 1 and (b) a scheme that always shows the certain item for 100% of page views.

Therefore, given that the maximum number of clicks is obtained by assigning 100% of the page views to the item with the highest expected CTR, as derived in the single-interval case above, the maximum of the Gain formula in Eq. 2, given $\theta_0$, $q_0$, $q_1$, $N_0$, and $N_1$ is derived to be the following:

$$\max_{x \in [0,1], x_1 \in X_1} \text{Gain}(x, x_1) = \max_{x \in [0,1]} \text{Gain}(x, \theta_0, q_0, q_1, N_0, N_1),$$

where $$\text{Gain}(x, \theta_0, q_0, q_1, N_0, N_1) = N_0x(\hat{p}_0 - q_0) + N_1E_c[\max\{\hat{p}_1(x,c) - q_1, 0\}].$$

The variables $\hat{p}_0$ and $\hat{p}_1(x,c)$ are functions of $\theta_0$. The above equation is possible because time interval 1 is the last interval, and by the discussion in connection with the single-interval case above, when the gain is maximized, $x_1(x,c)$ would either be 0 or 1 depending on whether $\hat{p}_1(x,c) - q_1 > 0$, for any given x and c. Also, because $\theta_0$, $q_0$, $q_1$, $N_0$ and $N_1$ are constants, $\text{Gain}(x, \theta_0, q_0, q_1, N_0, N_1)$ can be simply written as $\text{Gain}(x)$.

Normal Approximation

Therefore, the optimal solution for the Bayes 2×2 case described above is $$\max_{x \in [0,1]} \text{Gain}(x, \theta_0, q_0, q_1, N_0, N_1).$$

For a given class of probability distribution P of the number of clicks to be observed in time interval 0, the optimal x can be solved numerically. In the following discussion, P is taken to be either a Beta-Binomial distribution or a Gamma-Poisson distribution. It will be apparent to those of skill in the art that P could be taken as any one of a number of probability distribution types within the embodiments of this invention.

As an example, if $p_0 \sim \text{Beta}(\alpha, \gamma)$ (or $\text{Gamma}(\alpha, \gamma)$), i.e., $\theta_0 = [\alpha, \gamma]$, and $(c|p_0, xN_0) \sim \text{Binomial}(p_0, xN_0)$ or Poisson $(p_0 xN_0)$, then $\hat{p}_0 = \alpha/\gamma$ and $\hat{p}_1(x,c) = (\alpha+c)/(\gamma+xN_0)$. Therefore, the gain function becomes the following:

$$N_0x(\alpha/\gamma - q_0) + N_1 \sum_{c \ge (\gamma + xN_t)q_1 - \alpha} \Pr(c|\alpha, \gamma, xN_0)\left(\frac{\alpha+c}{\gamma + xN_t} - q_1\right), \quad \text{Eq. 4}$$

where $\Pr(c|\alpha, \gamma, xN_0)$ is the probability mass function of the Beta-Binomial (or Gamma-Poisson) distribution. The range of the above summation is $c \ge (\gamma + xN_t)q_1 - \alpha$ iff $\hat{p}(x,c) - q_1 \ge 0$.

The following is a discussion of a normal approximation used in one embodiment of the invention to facilitate computation of the Bayesian solution. This normal approximation is based on an assumption that the function $\hat{p}_1(x,c)$, which is a function of random variable c, is normally distributed. The variance of $p_0$ is denoted by $\sigma_0^2$ such that $$\sigma_0^2 = \frac{\alpha(\gamma - \alpha)}{\gamma^2(1 + \gamma)}$$

for a Beta-Binomial distribution and $\sigma_0 = \alpha/\gamma^2$ for a Gamma-Poisson distribution. Straightforward derivation reveals the following:

$$E[\hat{p}_1(x, c)] = \hat{p}_0 = \alpha/\gamma,$$
$$\text{Var}[\hat{p}_1(x, c)] = \sigma_1(x)^2 \equiv \frac{xN_0}{\gamma + xN_0}\sigma_0^2.$$

In other words, it is assumed that $\hat{p}_1(x,c) \sim N(\hat{p}_0, \sigma_1(x)^2)$.

Therefore, if $\phi$ and $\Phi$ denote the density and distribution functions of the standard normal distribution, then $$\text{Gain}(x, \theta_0, q_0, q_1, N_0, N_1) =$$
$$N_0x(\hat{p}_0 - q_0) + N_1\left[\sigma_1(x)\phi\left(\frac{q_1 - \hat{p}_0}{\sigma_1(x)}\right) + \left(1 - \Phi\left(\frac{q_1 - \hat{p}_0}{\sigma_1(x)}\right)\right)(\hat{p}_0 - q_1)\right].$$

Again, to simplify notations, $\text{Gain}(x, \theta_0, q_0, q_1, N_0, N_1)$ is written as $\text{Gain}(x)$. The first and second derivatives of $\text{Gain}(x)$, used to find the x that maximizes $\text{Gain}(x)$, are as follows:

$$\frac{d}{dx}\text{Gain}(x) = N_0(\hat{p}_0 - q_0) + \frac{N_1\sigma_0\gamma N_0^{1/2}}{2x^{1/2}(\gamma + xN_0)^{3/2}}\phi\left(\frac{q_1 - \hat{p}_0}{\sigma_1(x)}\right)$$

$$\frac{d^2}{dx^2}\text{Gain}(x) = A(x)[-4N_0x^2 + \gamma(B^2 - 1)x + B^2\gamma^2N_0^{-1}],$$

-continued where $$A(x) = \frac{N_1 \sigma_0 \gamma N_0^{1/2}}{4x^{5/2}(\gamma + xN_0)^{5/2}} \phi\left(\frac{q_1 - \hat{p}_0}{\sigma_1(x)}\right), \text{ and } B = (q_1 - \hat{p}_0)/\sigma_0.$$

Also, for convenience, the following is defined:

$$C = (\gamma/8N_0)(B^2 - 1 + [(B^2 - 1)^2 + 16B^2]^{1/2}).$$

The equation represented by C is the only solution for x to $$\frac{d^2}{dx^2} \text{Gain}(x) = 0,$$

for x>0, it the solution exists.
The function $$\frac{d}{dx} \text{Gain}(x)$$

is decreasing in x for C<x<1. The variable x* denotes the unique solution, if such solution exists, to $$\frac{d}{dx} \text{Gain}(x) = 0$$

for C<x<1. Therefore, $\max_{x \in [0,1]} \text{Gain}(x)$ achieves the maximum at x=0, x=1, or x=x*, if x* exists.

The optimal solution to the above case is $\max_{x \in [0,1]} \text{Gain}(x)$, the maximum of which is x*, if x* exists, as discussed above. Because $$\frac{d}{dx} \text{Gain}(x)$$

is decreasing, a binary search can be applied to find x*, which is the x between C and 1, such that $$\frac{d}{dx} \text{Gain}(x) = 0.$$

Bayes K×2 Case: K Items, Two Intervals

The Bayes 2×2 case described above can be extended to a case encompassing two time intervals with K items available to be displayed to users of the portal web page, without the need to distinguish between items with certain CTR and items with uncertain CTR. The optimal solution to this K×2 case can be defined, but finding the optimal solution is computationally challenging. Thus, the Lagrange relaxation technique is applied to find a near optimal solution. While the Lagrange relaxation technique is well-known, the application of this technique to this Bayes K×2 case is novel.

As indicated above, $p_{i,t} \sim P(\theta_{i,t})$ denotes the CTR of item i at time $t \in \{0,1\}$. The expected value of $p_{i,t}$ is denoted by $\mu(\theta_{i,t}) = E[p_{i,t}]$, which is a function of $\theta_{i,t}$. $\theta_t = [\theta_{1,t}, \ldots, \theta_{K,t}]$ represents the joint state of all items at time t, and the variable $x_{i,t}$ represents the fraction of page views to be given to item i at time t. As with the previous cases, the goal is to determine $x_{i,0}$ and $x_{i,1}$, for all i, in order to maximize the total number of clicks in the two time intervals. The variable $x_t$ is used to generally denote $[x_{1,t}, \ldots, x_{K,t}]$. These initial decisions are based on a known $\theta_0$. However, $\theta_1$ is not known because $\theta_1$ depends on $x_0$ and the numbers of clicks, $c_0 = [c_{1,0}, \ldots, c_{K,0}]$, which the items will receive after the items are served according to $x_0$.

The numbers that each $x_{i,0}$ represents is between 0 and 1. In contrast, each $x_{i,1}$ represents a function of $x_0$ and $c_0$. Also, it is assumed that, for any $\theta_0$, each $(x_0, c_0)$ uniquely identifies a next state $\theta_1(x_0, c_0)$. This is true for many common models, e.g., the Beta-Binomial model. Thus, it follows that $x_{i,1}$ can be considered as a function of $\theta_1(x_0, c_0)$. To emphasize this idea, $x_{i,1}$ is sometimes referred to in this description as $x_{i,1}(\theta_1)$.

The expected total number of clicks in the two time intervals is $$R(x, \theta_0, N_0, N_1) = N_0 \Sigma_i x_{i,0} \mu(\theta_{i,0}) + N_1 \Sigma_i E_{\theta_1}[x_{i,1}(\theta_1) \mu(\theta_{i,1})].$$

The goal is to find $$R^*(\theta_0, N_0, N_1) = \max_{0 \le x \le 1} R(x, \theta_0, N_0, N_1), \text{ subject to}$$

$$\sum_i x_{i,0} = 1 \text{ and } \sum_i x_{i,1}(\theta_1) = 1,$$

for all possible $\theta_1$.

Without the above constraints, $R(x, \phi_0, N_0, N_1)$ would be maximized by setting every $x_{i,t}$ to 1.

Lagrange Relaxation

To make the above optimization computationally feasible, the constraints on interval 1 are relaxed using the Lagrange relaxation technique. As discussed above, the optimization problem of the Bayes K×2 case is subject to a strict constraint: $\Sigma_i x_{i,1}(\theta_1) = 1$, for all possible $\theta_1$. Again, this constraint requires that the sum of all of the $x_{i,1}$ for each of the K items equal one. The difficulty is that the constraint is for every possible value of $\theta_1$, which translates into a constraint per possible value of $\theta_1$. Lagrange relaxation replaces that huge number of constraints with a single constraint, that is $E_{\theta_1} \Sigma_i x_{i,1}(\theta_1) = 1$. This is a single constraint, instead of a constraint per possible value of $\theta_1$.

More specifically, Lagrange relaxation substitutes the above-mentioned strict requirement that $\Sigma_i x_{i,1}(\theta_1) = 1$, for all possible $\theta_1$, with the requirement that $\Sigma_i x_{i,1}(\theta_1) = 1$ on average. Thus, the optimization problem becomes:

$$R^+(\vartheta_0, N_0, N_1) = \max_{0 \le x \le 1} R(x, \vartheta_0, N_0, N_1), \text{ subject to}$$

$$\sum_i x_{i,0} = 1 \text{ and } E_{\theta_1} \sum_i x_{i,1}(\theta_1) = 1.$$

This relaxed constraint is less exact than the original strict constraint, but the relaxed constraint is a good approximation of the original constraint. The relaxed constraint is also easier to compute than the original constraint. While the solution found with the relaxation technique may not be the optimal solution, the solution is close enough to optimal to warrant using the relaxation to make the calculations faster.

The Lagrange multiplier technique is a common technique used to handle constrained optimization problems like this, however application of the technique is new in the context of batched serving. The objective function is redefined by including the constraints, and then the resulting unconstrained problem is solved. The following variables are defined:

$$V(\theta_0, q_0, q_1, N_0, N_1) =$$

$$\max_{0 \leq x \leq 1} \left\{ R(x, \theta_0, N_0, N_1) - q_0 N_0 \left( \sum_i x_{i,0} - 1 \right) - q_1 N_1 \left( E\left[ \sum_i x_{i,0} \right] - 1 \right) \right\},$$

where $q_0$ and $q_1$ are the Lagrange multipliers. By the theory of Lagrange multipliers, under mild regulatory conditions, $$R^+(\vartheta_0, N_0, N_1) = \min_{q_0, q_1} V(\vartheta_0, q_0, q_1, N_0, N_1).$$

There are two important properties of the V function described above that significantly simplify the computation of the Bayes K×2 case: convexity and separability.

The equation $V(\theta_0, q_0, q_1, N_0, N_1)$ is convex in $(q_0, q_i)$. Because V is convex in $(q_0, q_1)$, standard non-differential convex optimization tools can be used to find the minimum solution. Now, the question is, given $(q_0, q_1)$, how to compute the V function efficiently.

With regard to the separability property, the following equation applies:

$$V(\theta_0, q_0, q_1, N_0, N_1) =$$

$$\sum_i \left( \max_{0 \leq x_{i,0} \leq 1} \text{Gain}(x_{i,0}, \theta_{i,0}, q_0, q_1, N_0, N_1) \right) + q_0 N_0 + q_1 N_1.$$

Figure 4A:
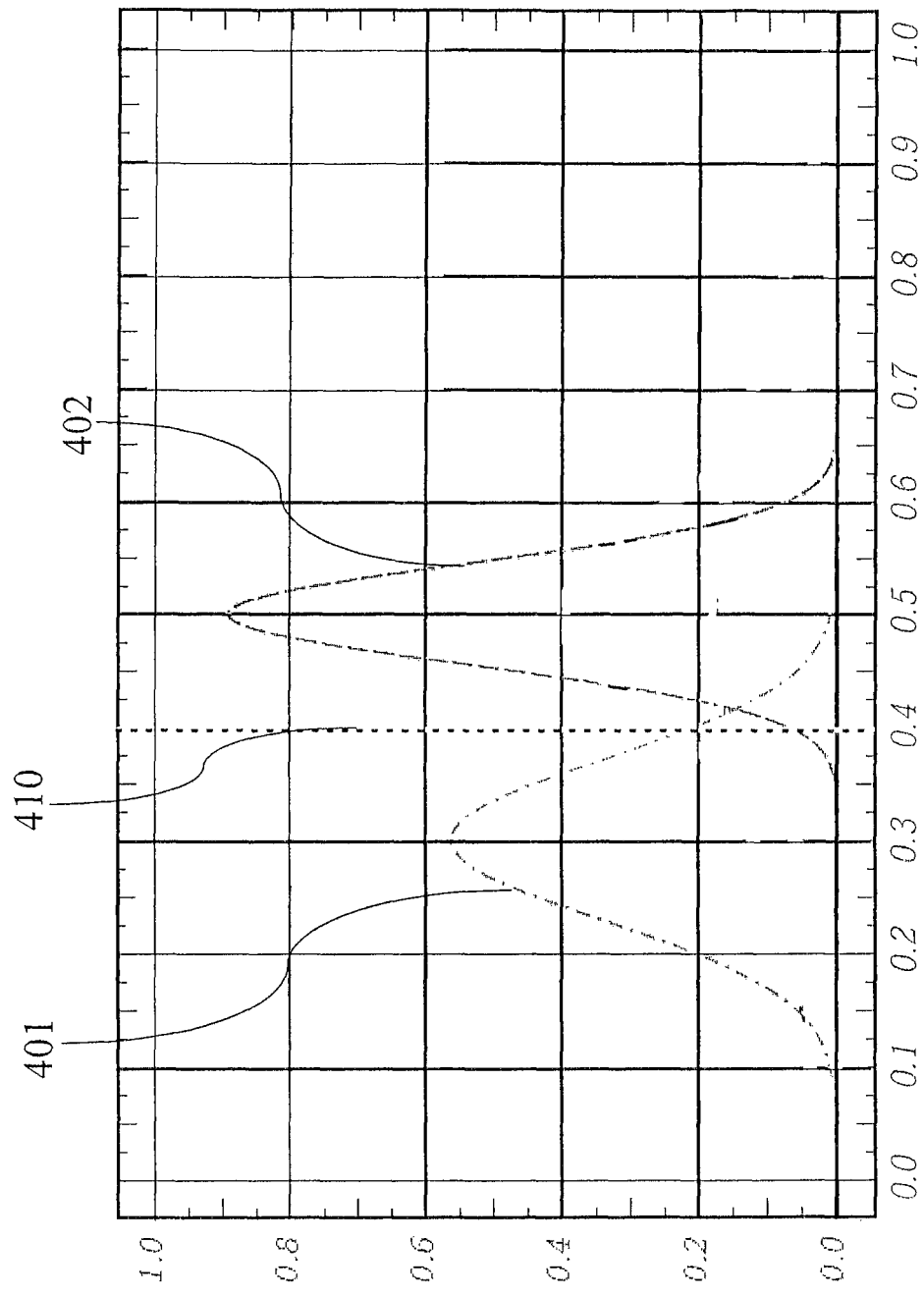
FIGS. 4A-4C are diagrams that illustrate a comparison of a set of two standard normal distribution graphs approximating probability distributions.
Figure 4B:
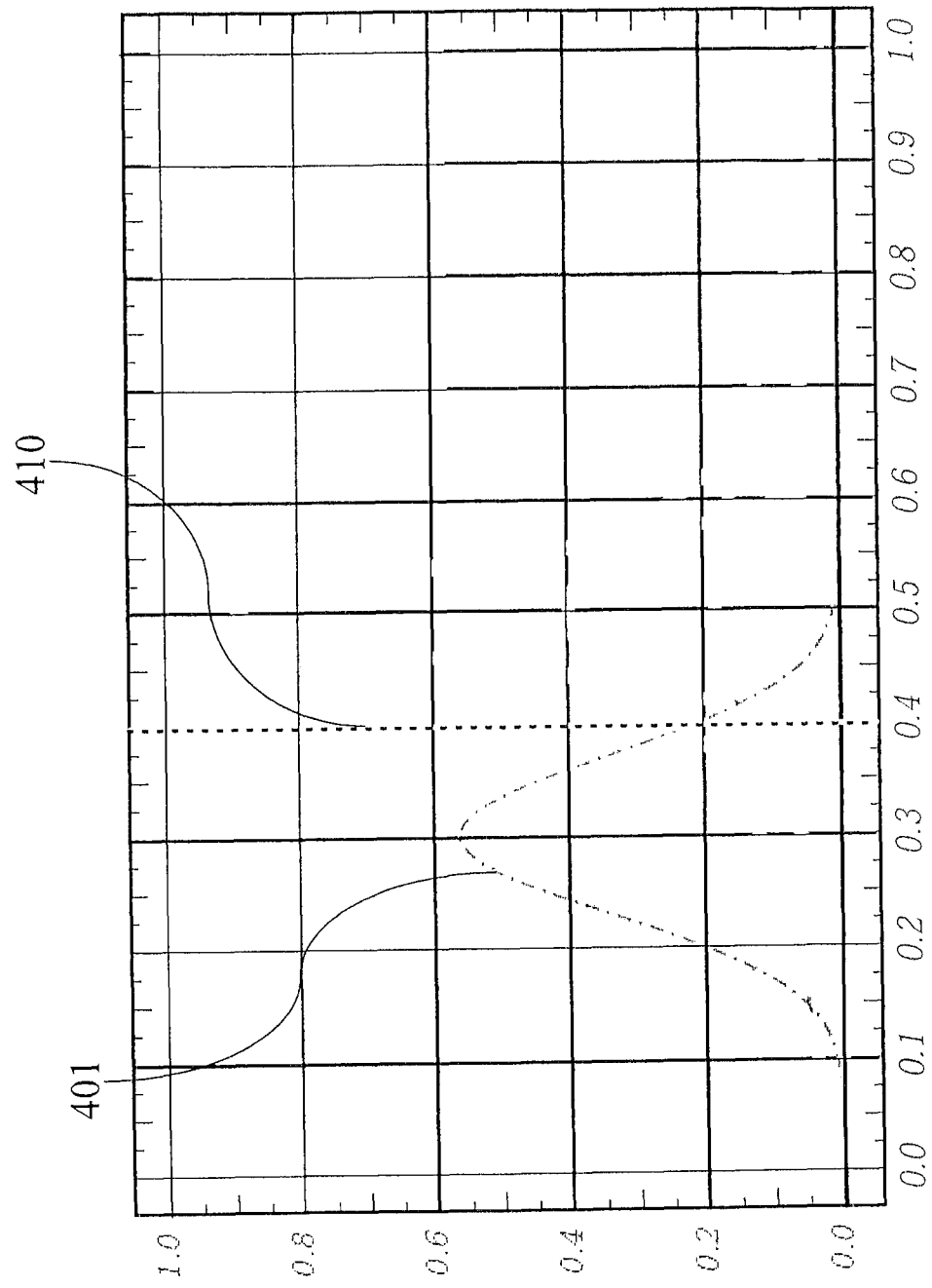
Figure 4C:
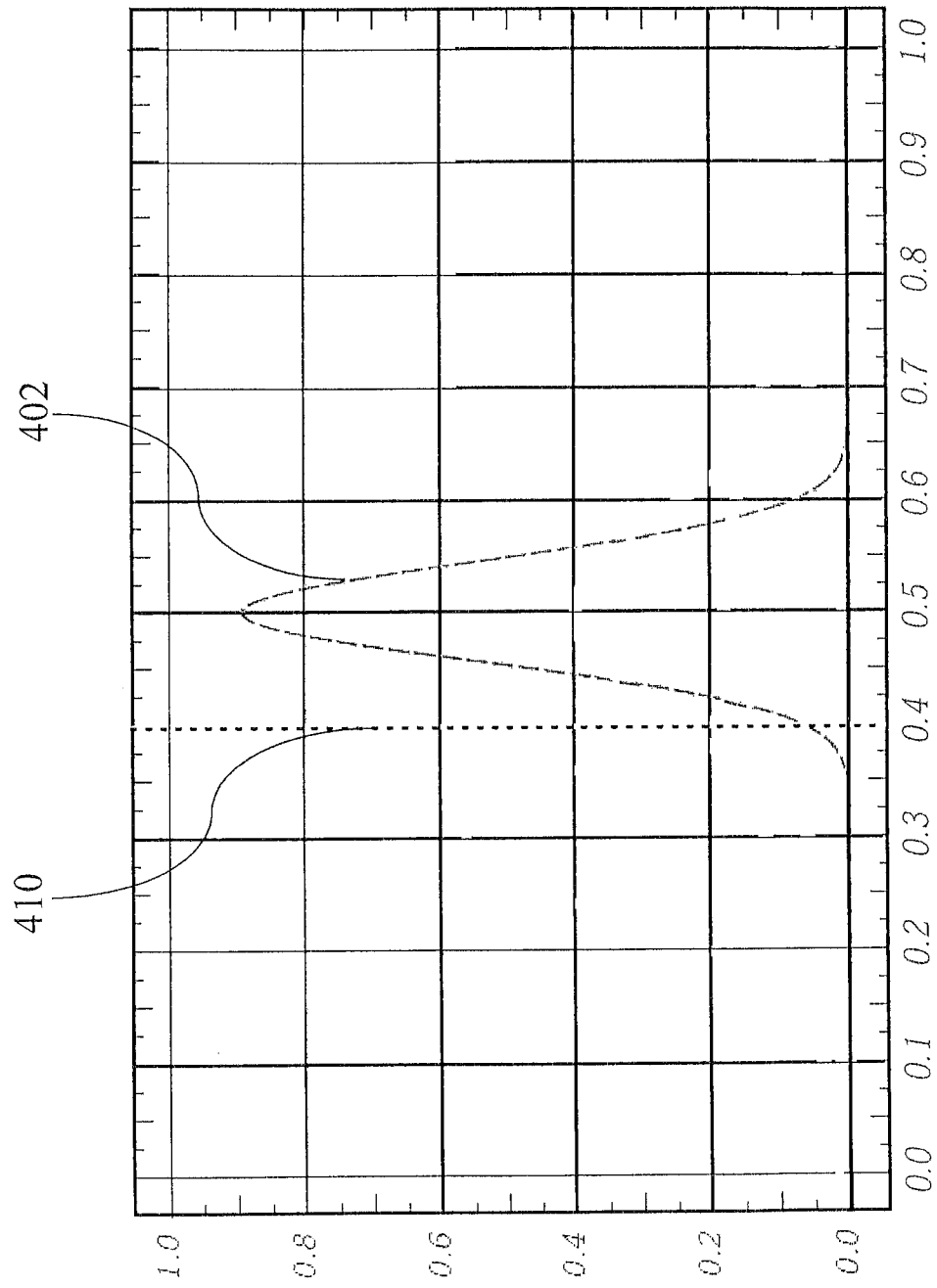

The separability property is important for efficient computation. Because of this property, maximization (over $x_{i,0}$) can be done for each item i independently to compute the V function. Generally, the problem of comparing probability distributions associated with content items in order to select the item with the greatest probability of a high click-through rate is a very complex problem. To split this calculation up into smaller calculations, the relaxed constraint introduces a representation of a hypothetical CTR associated with a hypothetical content item about which everything is known. Instead of having a probability distribution, this hypothetical item has an exact CTR value. For example, in FIG. 4A, a dotted line 410 represents a hypothetical item with a known click-through rate of 0.4. Instead of comparing probability distributions 401 and 402 to each other, the Lagrange relaxation technique allows the probability distribution for each item to be compared separately to hypothetical item 410, as is illustrated in FIG. 4B and FIG. 4C. In FIG. 4B, probability distribution 401 is compared to hypothetical item 410, and in FIG. 4C, probability distribution 402 is compared to hypothetical item 410.

Each problem represented by FIGS. 4B and 4C can be computed separately because they hypothetical item 410 is the same in each separate computation. As such, the hypothetical item 410 preserves the relative qualities of the different probability distributions 401 and 402. The inter-dependencies between each item's probability distribution is captured by the hypothetical item 410. Thus, in a system with K items, like the general case described below, the Lagrange relaxation changes what would be a K-dimensional optimization problem into K problems of one dimension.

This independent maximization reduces to the gain maximization discussed in connection with the Bayes 2×2 case and can be solved efficiently. Without the separability property, computation of function V involves joint maximization (over $x_{1,0}, \ldots, x_{K,0}$ jointly), which would have to be done in a K-dimensional space. Even if function V is concave (which may not be true) in $x_{1,0}, \ldots, x_{K,0}$, this joint maximization is expensive.

Therefore, the near optimal solution attained using Lagrange relaxation is computationally feasible, and thus preferable to the exact optimal solution attained without Lagrange relaxation. To decide what fraction of page views is given to each item i in the next interval (interval 0), a standard convex optimization tool is used to compute $\min_{q_0, q_1} V(\theta_0, q_0, q_1, N_0, N_1)$. The variables $q_0^*$ and $q_1^*$ denote the minimum solution. Then, $$x_{i,0}^* = \arg\max_{0 \leq x_{i,0} \leq 1} \text{Gain}(x_{i,0}, \theta_{i,0}, q_0^*, q_1^*, N_0, N_1)$$

is the fraction of page views to be given to item i during the future time interval.

General Solution to the Bayesian Optimization Problem

The solution for the general case is discussed, in which there is a dynamic set of items and non-stationary CTR. This general solution is a generalization of the Bayes K×2 solution discussed above, and one embodiment of the invention involves a two-stage approximation for multiple time intervals. As such, this general case involves K items and T+1 future time intervals (t=0, . . . , T). It is assumed that all of these K items are available in every future time interval. Similar to the bayes K×2 case after Lagrange relaxation is applied, the convexity and separability properties still hold (though the formulas need to be slightly modified). However, the computational complexity increases exponentially in T. Because a scalable serving method is desirable, the T+1 interval case is approximated by only considering two stages: The first stage (indexed by 0) contains interval 0 with $N_0$ page views, while the second stage (indexed by 1) contains the rest of the T time intervals with $\Sigma_{i \in [1,T]} N_t$ page views. The second stage is treated similarly to the second time interval in the Bayes 2×2 case. Thus, the approximate solution is obtained by solving the Bayes 2×2 case where $N_1$ is replaced by $\Sigma_{i \in [1,T]} N_t$.

The general solution case takes into account a dynamic set of items. Items in a content optimization system come and go. For example, to ensure freshness, a business rule might specify that the lifetime of each item available to be presented to users is at most one day. Thus, the decision of what fraction of page views to allocate to each item logically focuses on the set of live items in the next time interval (indexed by 0). Generally, the solution to the present case is to apply the two-stage approximation to each individual item such that the lifetime constraint of each item is also satisfied. The theoretical justification is that the separability property still holds if the lifetime constraint for each item is included in the calculation.

The quantities start(i) and end(i) denote the start interval and end interval of item i. The variable $I_0$ denotes the set of live items, which are items i with start(i)≤0. The variable $T = \max_{i \in I_0} \text{end}(i)$ denotes the end time of the item in $I_0$ having the longest lifetime. Variable $I^+$ denotes the set of items i with 1≤start(i)≤T, which are also called future items. For ease of exposition, $end_T(i)$ represents $\min\{T, end(i)\}$. The two-stage approximation is extended to include item lifetime constraints by modifying the V function, discussed in connection with Lagrange relaxation above, as follows:

$$V(\vartheta_0, q_0, q_1, N_0, \ldots, N_T) =$$

$$\sum_{i \in I_0} \max_{0 \leq x_{i,0} \leq 1} \text{Gain}\left(x_{i,0}, \theta_{i,0}, q_0, q_1, N_0, \sum_{t=1}^{end_T(i)} N_t\right) +$$

$$\sum_{i \in I^+} \max_{0 \leq y_i \leq 1} \text{Gain}\left(y_i, \theta_{i,0}, q_1, q_1, N_{start(i)}, \sum_{t=start(i)+1}^{end_T(i)} N_t\right) +$$

$$q_0 N_0 + q_1 \sum_{t \in [1,T]} N_t$$

Standard convex minimization techniques are applied to find the $q_0^*$ and $q_1^*$ that minimize the above V function. The $x_{i,0}$ that maximizes the Gain function at $q_0 = q_0^*$ and $q_1 = q_1^*$ is the fraction of page views to be given to item i in the next time interval. The above V function is now expounded.

Live items ($I_0$) require different treatment than future items ($I^+$). Thus, there are two separate summation terms. The two-stage approximation is applied for each item. For a live item i, time interval 0 is the first stage, while the second stage includes time intervals 1, ..., $end_T(i)$. For a future item i, the first stage is start(i)≠0, and the second stage includes intervals start(i)+1, ..., $end_T(i)$. Again, the goal is to determine what fraction $x_{i,0}$ of page views should be given to each live item i in the immediate next interval (interval 0). Therefore, a different variable, i.e., $y_i$, is used to denote the first-stage decision for future item i, which enters the system later than interval 0.

With respect to Lagrange multipliers, $q_0$ is used to ensure that $\Sigma_{i \in I_0} x_{i,0} = 1$ for live items. Because future items are not available in interval 0, their gains do not include $q_0$. The variable $q_1$ is used to ensure that the expected total number of page views given to items between interval 1 and T in the optimization matches the actual number of page views (i.e., $\Sigma_{t \in [1,T]} N_t$). Thus, $q_1$ is in both gain functions. Furthermore, in the gain function for future items, there are two occurrences of $q_1$ because both stages for future items are between interval 1 and T.

With respect to item lifetime the following expressions, $N_0$, $\Sigma_{t=1}^{end_T(i)} N_t$ (in the gain function of live items) and $N_{start(i)}$, $\Sigma_{t=start(i)+1}^{end_T(i)} N_t$ (in the gain function of future items) incorporate item lifetimes into the optimization.

With respect to prior distribution, $\theta_{i,0}$ represents the current belief about the CTR of item i. For live items, $\theta_{i,0}$ is the current state, which has been updated by all of the observed clicks by users in the past. For future items, there are no observations. Thus, $\theta_{i,0}$ is estimated (or initialized) based on analysis of historical data.

The approach to non-stationary CTR is by using dynamic models. When the state is updated from $\theta_{i,t}$ to $\theta_{i,t+1}$ after observing $c_{i,t}$ clicks in $x_{i,t} N_t$ page views, instead of assuming that the CTRs of item i at time t and t+1 are the same, the CTRs are allowed to have small changes. In one embodiment of the invention, exponentially weighted Beta-Binomial (EWBB) and Gamma-Poisson (EWGP) models are used for handling non-stationary CTR. Under these models, CTR is $p_{i,t} \sim \text{Beta}(\alpha, \gamma)$ or $\text{Gamma}(\alpha, \gamma)$, i.e., $\theta_{i,t} = [\alpha, \gamma]$, where $\alpha$ and $\gamma$ can be thought of as the number of clicks and the number of views that were observed in the past for item i. After observing c clicks in v page views, if CTR does not change over time, the state is updated by $\theta_{i,t+1} = [\alpha + c, \gamma + v]$.

The EWBB and EWGP models are simple. The variable w, such that 0≤w≤1, is a user-specified weight that needs to be tuned. The state is updated by $\theta_{i,t+1} = [w\alpha + c, w\gamma + v]$. If w is set to 0, then the instant CTR is tracked by ignoring all the past observations. This is an unbiased estimate of the current state, but the variance (uncertainty) would be large unless the item is allocated a large number of page views in time t. If w is set to 1, then this setting practically assumes a stationary CTR. In this case, although variance is reduced by using all the past observations, the estimate of current state is biased toward the past. A good w value needs to be found based on application-specific characteristics and analysis of historical data. The difference between EWBB and EWGP is in the way that the variance is computed.

Using the EWBB/EWGP model in the Bayesian framework set forth in the embodiments of the invention is also simple. For each interval, after observing users' actual clicks, the EWBB/EWGP model is used to update the state of each item. Also, in the gain function computation discussed in connection with the Bayes 2×2 case—which is used in the two-stage approximation for the general case—$\alpha$ and $\gamma$ are down-weighted in the second interval by w. Specifically, in the normal approximation, the following is redefined as stated:

$$\text{Var}[\hat{p}_1(x, c)] = \sigma_1(x)^2 \equiv \frac{xN_0}{w\gamma + xN_0} \sigma_{0w}^2,$$

where $$\sigma_{0w}^2 = \frac{\alpha(\gamma - \alpha)}{\gamma^2(1 + w\gamma)} \text{ for EWBB and } \sigma_{0w}^2 = \frac{\alpha}{w\gamma^2} \text{ for EWGP.}$$

A more detailed discussion of the solution to the Bayesian optimization problem is located in Section 3 of Appendix A.

Hardware Overview

Figure 5:
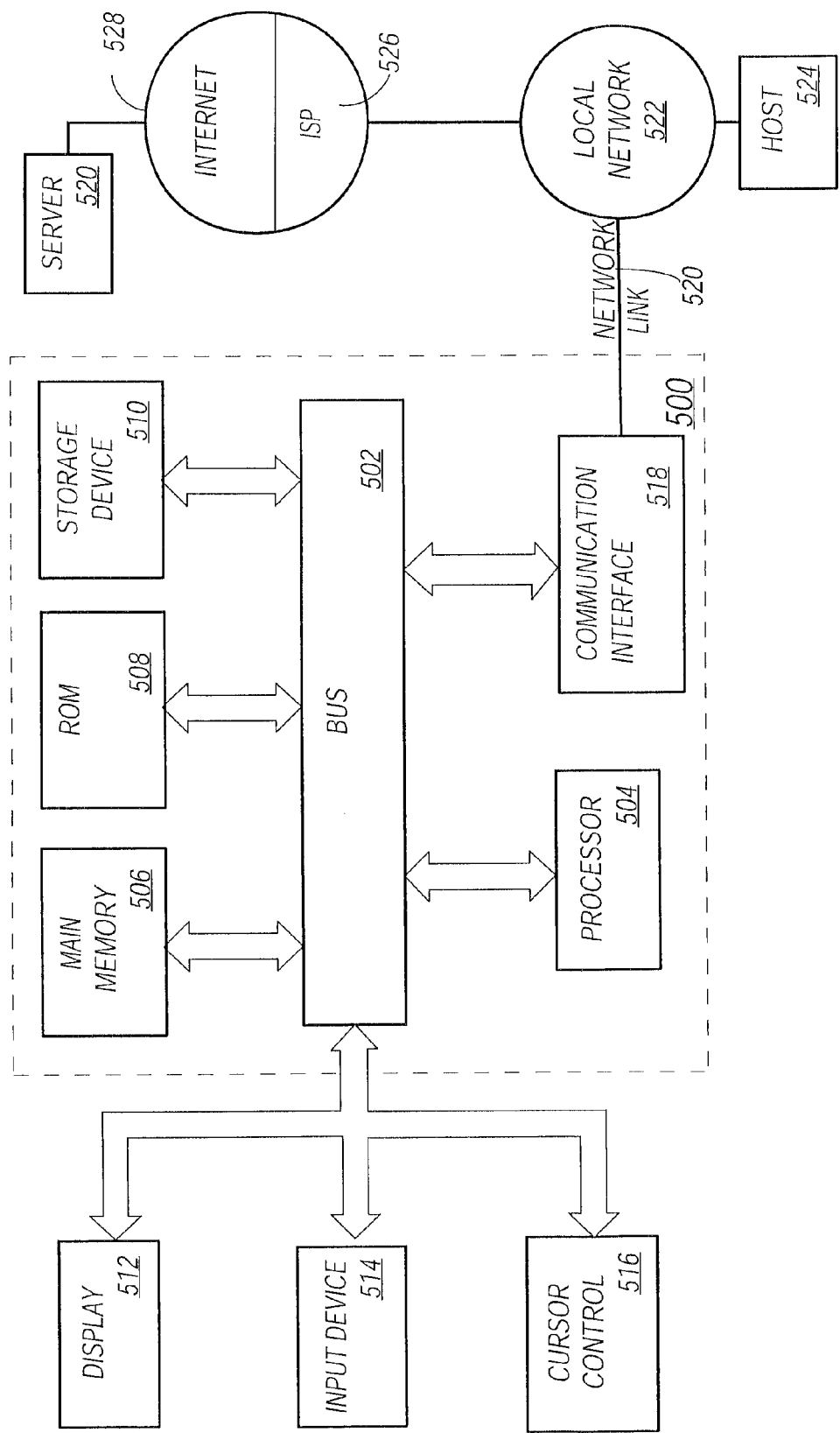
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

1. INTRODUCTION

An important problem for ad-networks, search engines and web portals is to algorithmically decide on the "best $k$ matches" from a pool of items for every user visit in a given context. For instance, in web search, the contextual information is given by the user specified query and the goal is to select the top-$k$ search results. In online adverstising, the context is provided by the query (Sponsored Search) or the webpage (Contextual Advertising), the objective is to select the best ads to show from a large ad inventory. Recently, algorithmic approaches to deliver the best content when users visit web portals has also proved effective in several applications. In all matching problems described above, the goal is to maximize yield defined through a readily available metric like click-through rate (number of clicks per page view in a specified time interval).

Statistical models that predict click-through rates on items for a user visit in a given context provide an attractive framework to solve the above mentioned matching problems. Such models are often trained on a large corpus of retrospective data that are continuously obtained from a current system. The crucial modeling task is to estimate interactions among users, context and items so that we converge to high yield regions rapidly. Learning purely from retrospective data obtained from a current serving scheme is limited since it fails to obtain data necessary to estimate all important interactions. One attractive solution is to augment the data by running randomized experiments for a certain fraction of pageviews. However, naive randomization is suboptimal in terms of maximizing the overall total yield. An adaptive sampling strategy (also referred to as explore/exploit in the literature) can perform much better. We explore items to find good ones more effectively and exploit the ones that are currently known to have good yield rates. This is a challenging in our context due to the following reasons.

- *Data sparsity:* For most matching problems, it is necessary to work with large feature spaces to obtain unbiased estimates. However, this leads to extreme sparsity since we observe only a few interactions for a majority of user-context-item triplets. Moreover, the click-through rate (CTR hereafter) are also small, leading to increased learning time.

- *Dynamic system:* The system is dynamic in terms of both the item pool and user population. Moreover, the CTRs themselves change over time. Estimating CTRs in the presence of such dynamism adds yet another twist to the estimation problem.

In the rest of the paper, we describe our explore-exploit solutions for a content optimization problem. However, we note that our methods are general and apply to other matching problems mentioned above. Before proceeding further, we provide a description of our application.

1.1 Content Optimization Application

Developing effective algorithmic approaches to deliver content when users visit web portals is a fundamental problem that has not received much attention. Portals that cater to users who browse a site are typically programmed manually. This is because content is harder to assess for relevance, topicality, freshness, and personal preference; there is a wide range in the quality; and there are no reliable quality or trust metrics (such as, say, PageRank or Hub/Authority weights for URLs). Manual programming of content ensures high quality and maintains the editorial "voice" (the typical mix of content) that users associate with the site. On the other hand, it is expensive to scale as the number of articles and the number of site pages we wish to program grow. A data-driven machine learning approach can help with the scale issue, and we seek to blend the strengths of the editorial and algorithmic approaches by algorithmically optimizing content programming within high-level constraints set by editors.

Our application considers one such problem of optimizing content published regularly on a module on the Front Page of a large Internet portal. The module is a panel with several slots. Each slot displays a content item (or story) that consists of a picture, a short summary and several links to the full article and related web pages. This module is one of the most prominent content piece published by the portal that provides several other services (e.g Mail, Weather)

and content pieces on its Front Page. Our goal is to algorithmically select the "best" content items for a given user visit from a pool of candidates to maximize a performance metric. Possible metrics include the portal's revenue, user engagement, etc. In this paper, we focus on maximizing the overall CTR of the module, i.e., we maximize the total number of clicks received by the module over a large time period (e.g. several months). For ease of exposition, we will only consider selection of articles to be placed on the single most important slot.

The pool of available items is dynamic; it is created by trained human editors, and refreshed continually. At any point in time, there are $k$ live articles in the pool. New articles programmed by editors get *pushed* into the system periodically (every few hours) and replace some old articles. The editors keep up with important new stories (e.g., breaking news) and eliminate irrelevant and fading stories, and ensure that the pool of articles is consistent with the "voice" of the site (i.e., the desired nature and mix of content). There is no personalization in the editorially programmed system: at a given time, the same articles are seen by all users visiting the page. We consider how to choose the best article to display to a given user. Since the mix of content in the available pool already incorporates constraints like *voice*, topicality, etc., we focus on choosing articles to maximize overall click-through rate (CTR). In fact, this paper describes explore/exploit strategies that selects the best articles to show in terms of overall popularity for different traffic volumes and item pool size. Extensions to feature based models are also discussed We mention several characteristics of our application that makes the classicial explore/exploit solutions based on multi-armed bandit theory not directly applicable; this motivated the research described in this paper.

- Dynamic set of items: Items usually have short lifetimes (6-8 hours) and the pool of available items is constantly changing. This makes our problem distinct from classical explore/exploit scenarios that typically assumes a static item pool.
- Non-stationary CTR: The CTR of an item changes gradually over time. Although the change is small within a few minutes, the CTR of a given item at its high point (usually during the day) can be four times higher than that at its low point (usually during the night). We estimate item performance through time via a per item dynamic model. Our explore/exploit methods provide adaptive sampling strategies that maximizes overall CTR by converging to the best items quickly.
- Batch Serving: Due to time lag between a view and subsequent clicks (approximately 2-10 minutes), decisions can only be made for a batch of pageviews. In fact, our methods provide a sampling plan for pageviews in a time interval of certain length. We note that this is in sharp contrast to the classical framework where sampling decisions are made for a current pageview based on instantaneous outcomes available from all previous pageviews.

Contributions: Our contributions include: (1) We develop a novel Bayesian explore/exploit scheme for content optimization that explicity incorporates the constraints of batched serving with a dynamic set of items and non-stationary CTR. (2) A present novel adaptations of priority-based schemes in the multi-armed bandit literature to our problem setting. (3) Extensions of the Bayesian schemes to allow effective explore/exploit with feature based models is also proposed and (4) Extensive experimental analysis of a diverse set of schemes on both synthetic data and a *large* amount of *unbiased* real data.

2. PROBLEM DEFINITION

Throughout this paper, index $i$ runs through items, and index $t$ runs through time intervals. We first describe our methods for serving items through time based on overall popularity, extensions to cases where we incorporate user features will be considered in section 3.6.

- Let $p_{i,t}$ denote the CTR of item $i$ in time interval $t$. The $p_{i,t}$'s are unknown quantities that gradually change over time and need to be estimated.
- Let $N_t$ denote the total number of page views in interval $t$. Since the temporal pattern of $N_t$ is very stable, we assume the $N_t$'s are known constants (or have been accurately estimated).
- Let $\mathcal{I}_t$ denote the set of candidate items available in interval $t$. For the specific application considered, the lifetime of an item (number of 5 minute intervals during which the item is in $\mathcal{I}_t$) is in the order of few hundred intervals.

A *serving scheme* (or policy) $\pi$ is an algorithm that, for each interval $t$, decides what fraction of page views ($N_t$) should be given to each item based on all the data observed before $t$. We note that this is different from classical multi-armed bandits where one selects the best article to show per page view based on some priority function that is a function of all past data. As mentioned earlier, we cannot implement such a scheme since there is a time lag between view and click. We use the following notations:

- Let $x_{i,t}^\pi$ denote the fraction of page views that $\pi$ decides to give item $i$ for interval $t$. Note that $\sum_{i \in \mathcal{I}_t} x_{i,t}^\pi = 1$, for any $t$. Also note that $x_{i,t} N_t$ is the number of page views that the serving scheme gives to item $i$ in interval $t$.
- Let $c_{i,t}^\pi$ denote the total number of clicks on item $i$ in interval $t$ when serving scheme $\pi$ gives $x_{i,t}^\pi N_t$ page views to item $i$. In this paper, we consider $c_{i,t}^\pi$ to be generated either according to the Poisson distribution with mean $p_{i,t} x_{i,t}^\pi N_t$ or according to the Binomial distribution with click probability $p_{i,t}$. Our experimental study shows that the Poisson distribution fits very well to our content optimization application. The superscript $\pi$ will be dropped from our notations when it is unambiguous from the context.

DEFINITION 1. Scheme Determination Problem: *Let* $R(\pi, T) = \sum_{1 \leq t \leq T} \sum_{i \in \mathcal{I}_t} c_{i,t}$ *denote the total number of* clicks (or reward) that we receive over $T$ intervals by using serving scheme $\pi$. Given $N_t$ and $\mathcal{I}_t$, for $1 \leq t \leq T$, we want to find a serving scheme $\pi$ that maximizes the expected reward $E[R(\pi, T)]$.

We note that maximizing *expected* reward may not be the best objective since it does not ensure robustness of the policy. For instance, it is possible that the serving scheme $\pi$ that maximizes $E[R(\pi, T)]$ has a high variance $Var[R(\pi, T)]$. In this case, it can be risky to use scheme $\pi$. One possible solution is to redefine our goal as to find the serving scheme $\pi$ that maximizes:

$$E[R(\pi, T)] - \rho \sqrt{Var[R(\pi, T)]},$$

where $\rho \geq 0$ is a parameter representing how conservative we want to be. This formulation is similar to the idea of balancing the expected return and risk in Markowitz's portfolio theory. Although we do not consider optimizing this objective in this paper, in our experimental study, we compare different schemes by their risks ($Var[R(\pi, T)]$), in addition to the expected reward ($E[R(\pi, T)]$) that is being optimized by the policies.

3. BAYESIAN SOLUTION

In this section, we describe a novel Bayesian explore/exploit method that incorporates the main characteristics of our application (dynamic item pool, non-stationary CTR, batched serving) discussed earlier. We develop our Bayesian scheme in steps. We start with two simple cases for which we can derive optimal solutions, and then describe our near optimal solution for the general case which is close to an index policy. The solutions to the simple cases will be used as building blocks to obtain the solution for the general case. We develop solutions for the simple cases assuming a static item pool and stationary CTR; dynamic item pools and non-stationarity are incorporated in our near optimal solution.

3.1 Preliminaries

To set up notations, we consider a single item and drop the item index $i$. Let $p_t$ (true CTR of the item in interval $t$) has posterior distribution $\mathcal{P}(\theta_t)$, written as $p_t \sim \mathcal{P}(\theta_t)$, where $\theta_t$, a vector, is the hyperparameter or state of the distribution. After we serve the items $x_t N_t$ times and observe $c_t$ clicks, we obtain the posterior distribution $\mathcal{P}(\theta_{t+1})$ of $p_{t+1}$.

We note that $c_t$ is a random variable that will be used in our calculations; to emphasize that $\theta_{t+1}$ is a function of $c_t$ and $x_t N_t$, we sometimes write $\theta_{t+1}(c_t, x_t N_t)$. Note that, when we want to decide what fraction of page views should be given to the item in interval $t$, $\theta_t$ is known or can be estimated by a model. However, $\theta_{t+1}(c_t, x_t N_t)$ is random because we have not yet observed $c_t$.

In the following, we describe two commonly used models. For simplicity, we assume a stationary CTR process over time. Dynamic CTR models will be discussed later.

Beta-Binomial model: Consider the prior distribution $\mathcal{P}(\theta_t)$ to be the Beta distribution $Beta(\alpha_t, \gamma_t)$ with mean $\alpha_t/\gamma_t$ and variance $\frac{\alpha(\gamma-\alpha)}{\gamma^2(1+\gamma)}$; i.e., $\theta_t = [\alpha_t, \gamma_t]$. Note that we choose to parameterize the Beta distribution using the effective number of successes $\alpha_t$ and the effective sample size $\gamma_t$ for ease of exposition. Suppose we show item $i$ for $x_t N_t$ page views and get $c_t$ clicks, where $c_t$ given $p_t$ and $x_t N_t$ follows $Binomial(p_t, x_t N_t)$. It is well known that, after we observe $c_t$ clicks, the posterior distribution of CTR $\mathcal{P}(\theta_{t+1})$ is also a beta distribution $Beta(\alpha_t + c_t, \gamma_t + x_t N_t)$.

An intuitive interpretation of the Beta-Binomial model is as follows. Before we observe $c_t$, we believe $E[p_t] = \alpha_t/\gamma_t$, which can be thought of as having observed $\alpha_t$ clicks in $\gamma_t$ page views in the past. After observing $c_t$ clicks in $x_t N_t$ views, we estimate CTR by the total number of clicks over the total number of views; i.e., $E[p_t \mid c_t] = (\alpha_t + c_t)/(\gamma_t + x_t N_t)$.

When we want to decide what fraction $x_t$ of page views should be given to the item in interval $t$, we have not observed $c_t$. For a given $x_t$, it is well-known that marginalizing over $p_t$ we obtain the unconditional distribution of $c_t \sim BetaBin(\alpha_t, \gamma_t, x_t N_t)$. This Beta-Binomial distribution defines $\Pr(\theta_{t+1}(c_t, x_t N_t) \mid x_t, \theta_t)$, the probability of changing from state $\theta_t$ to state $\theta_{t+1}(c_t, x_t N_t)$ for a given decision $x_t$.

Gamma-Poisson model: Consider the prior distribution $\mathcal{P}(\theta_t)$ to be the Gamma distribution $Gamma(\alpha_t, \gamma_t)$ with mean $\alpha_t/\gamma_t$ and variance $\alpha_t/\gamma_t^2$; i.e., $\theta_t = [\alpha_t, \gamma_t]$. Suppose we show item $i$ for $x_t N_t$ page views and get $c_t$ clicks, where $c_t$ given $p_t$ and $x_t N_t$ follows $Poisson(p_t x_t N_t)$. It is well known that, after we observe $c_t$ clicks, the posterior distribution $\mathcal{P}(\theta_{t+1})$ is also the Gamma distribution $Gamma(\alpha_t + c_t, \gamma_t + x_t N_t)$.

The Gamma-Poisson model has a similar interpretation to the Beta-Binomial model. The difference is that the Poisson distribution has a heavier tail than the Binomial distribution, meaning that it assumes more variability of the observed clicks than the Binomial distribution. The unconditional distribution of $c_t$, after marginalizing over $p_t$, is the Negative Binomial distribution $NegBin(\alpha_t, \gamma_t, x_t N_t)$

3.2 Single-Interval Case

Let us start with the simplest problem setting, a one-step lookahead. Suppose we want to decide how to serve in the next interval, which is the only interval left. We call this interval 1. That is, we want to find the $x_{i,1}$'s that maximizes the total number of clicks in interval 1; i.e., $$\max_{x_{i,1}} E[\sum_{i \in \mathcal{I}_1} x_{i,1} N_1 p_{i,1}] = \max_{x_{i,1}} \sum_{i \in \mathcal{I}_1} x_{i,1} N_1 E[p_{i,1}]$$

subject to $\sum_{i \in \mathcal{I}_1} x_{i,1} = 1$ and $0 \leq x_{i,1} \leq 1$, for all $i$. It is easily seen that the maximum is attained if we assign 100% page views to the item with highest expected CTR, i.e, we set $x_{i^*,1} = 1$ if $E[p_{i^*,1}] = \max_i E[p_{i,1}]$, and set other $x_{i,t} = 0$. To summarize, if we only have one interval left, the optimal policy is to always show the item with highest posterior mean.

Optimal solution with single lookahead: The optimal number of clicks with a single lookahead interval is $N_1 \max_i E[p_{i,1}]$

3.3 Bayes 2×2: Two Items, Two Intervals

Another simple case where we can efficiently find the optimal solution is the Bayes 2×2 case, i.e., we have two items and two remaining intervals. Bandit solutions for two armed cases have been studied in the literature before [4, 14] but under assumptions different than ours. In addition, suppose we know the CTR of one item exactly without any uncertainty. We use 0 and 1 as the time indices of the two intervals. Since there are only two items, we simplify our notations.

- Let $N_0$ and $N_1$ denote the number of page views in interval 1 and 2 respectively.
- Let $q_0$ and $q_1$ denote the CTR of one of the items, assumed to be known without any uncertainty in the two intervals.
- Let $p_0 \sim \mathcal{P}(\theta_0)$ and $p_1 \sim \mathcal{P}(\theta_1)$ denote the CTR of the uncertain item in interval 0 and interval 1. Note that $\theta_0$ is a known quantity, while $\theta_1$ is random since it is a function of random number of clicks obtained in interval 0.
- Let $x$ and $x_1$ denote the fraction of page views to be given to the uncertain item in interval 0 and interval 1, respectively. Note that $(1-x)$ and $(1-x_1)$ are the fractions to be given to the certain item.
- Let $c$ be a random variable representing the number of clicks that the uncertain item gets in interval 0.
- Let $\hat{p}_0 = E[p_0]$ and $\hat{p}_1(x,c) = E[p_1 \mid x, c]$.

Note that the decision $x_1$ depends on $x$ and $c$. To emphasize $x_1$ is a function of $x$ and $c$, we sometimes write $0 \leq x_1(x,c) \leq 1$. Let $\mathcal{X}_1$ denote the domain of $x_1$, which is the set of all possible such functions that return a number between 0 and 1 for given $(x,c)$. Our goal is to find $x \in [0,1]$ and $x_1 \in \mathcal{X}_1$ that maximize the expected total number of clicks in the two intervals, given by $$E[N_0(xp_0 + (1-x)q_0) + N_1(x_1p_1 + (1-x_1)q_1)]$$
$$= E[N_0x(p_0 - q_0) + N_1x_1(p_1 - q_1)] + q_0N_0 + q_1N_1.$$

Since $q_0N_0$ and $q_1N_1$ are constants, we only need to maximize the expectation term. That is to find $x$ and $x_1$ that maximize:

$$Gain(x, x_1) = E[N_0x(p_0 - q_0) + N_1x_1(p_1 - q_1)], \quad (1)$$

which is the difference in the number of clicks between: (a) a scheme that shows the uncertain item for $xN_0$ times in interval 0 and $x_1N_1$ times in interval 1 and (b) a scheme that always shows the certain item for 100% of page views.

PROPOSITION 1. Given $\theta_0$, $q_0$, $q_1$, $N_0$ and $N_1$, $$\max_{x \in [0,1], x_1 \in \mathcal{X}_1} Gain(x, x_1) = \max_{x \in [0,1]} Gain(x, \theta_0, q_0, q_1, N_0, N_1),$$

where $Gain(x, \theta_0, q_0, q_1, N_0, N_1) =$ $$N_0x(\hat{p}_0 - q_0) + N_1 E_c[\max\{\hat{p}_1(x,c) - q_1, 0\}].$$

Note that $\hat{p}_0$ and $\hat{p}_1(x,c)$ are functions of $\theta_0$. Because $\theta_0$, $q_0$, $q_1$, $N_0$ and $N_1$ are constants, if there is no confusion, we simply write $Gain(x)$.

*Rationale:* The intuition is that, because interval 1 is the last interval, by the discussion of Section 3.2, when the gain is maximized, $x_1(x,c)$ would either be 0 or 1 depending on whether $\hat{p}_1(x,c) - q_1 > 0$, for any given $x$ and $c$.

Optimal solution: The optimal number of clicks in the bayes 2×2 case is $\max_{x \in [0,1]} Gain(x, \theta_0, q_0, q_1, N_0, N_1)$. For a given class of distribution $\mathcal{P}$, the optimal $x$ can be solved numerically. In the following, we consider the case where $\mathcal{P}$ is a beta distribution. We also provide an normal approximation that enable us to find the optimal solution efficiently.

Beta-Binomial/Gamma-Poisson model: As an example, assume $p_0 \sim Beta(\alpha, \gamma)$ (or $Gamma(\alpha, \gamma)$), i.e., $\theta_0 = [\alpha, \gamma]$, and $(c \mid p_0, xN_0) \sim Binomial(p_0, xN_0)$ or $Poisson(p_0 xN_0)$. Then, we have: $\hat{p}_0 = \alpha/\gamma$ and $\hat{p}_1(x,c) = (\alpha+c)/(\gamma+xN_0)$. The gain function becomes:

$$N_0x(\alpha/\gamma - q_0) + N_1 \sum_{c \geq (\gamma + xN_t)q_1 - \alpha} \Pr(c \mid \alpha, \gamma, xN_0) \left( \frac{\alpha+c}{\gamma+xN_t} - q_1 \right),$$

where $\Pr(c \mid \alpha, \gamma, xN_0)$ is the probability mass function of the Beta-Binomial (or Gamma-Poisson) distribution. Note the range of the above summation: $c \geq (\gamma + xN_t)q_1 - \alpha$ iff $\hat{p}_1(x,c) - q_1 \geq 0$.

Normal approximation: To speedup computation, we use the following normal approximation: Assume $\hat{p}_1(x,c)$, a function of random variable $c$, is normally distributed. Let $\sigma_0^2$ denote the variance of $p_0$; i.e., $\sigma_0^2 = \frac{\alpha(\gamma-\alpha)}{\gamma^2(1+\gamma)}$ for Beta and $\sigma_0^2 = \alpha/\gamma^2$ for Gamma. By a straightforward derivation, we obtain:

$$E[\hat{p}_1(x,c)] = \hat{p}_0 = \alpha/\gamma,$$
$$Var[\hat{p}_1(x,c)] = \sigma_1(x)^2 \equiv \frac{xN_0}{\gamma+xN_0}\sigma_0^2;$$

i.e., we assume $\hat{p}_1(x,c) \sim \mathcal{N}(\hat{p}_0, \sigma_1(x)^2)$.

PROPOSITION 2. *Let $\phi$ and $\Phi$ denote the density and distribution functions of the standard normal distribution.*

$$Gain(x, \theta_0, q_0, q_1, N_0, N_1) = N_0x(\hat{p}_0 - q_0) +$$
$$N_1 \left[ \sigma_1(x)\phi\left(\frac{q_1-\hat{p}_0}{\sigma_1(x)}\right) + \left(1 - \Phi\left(\frac{q_1-\hat{p}_0}{\sigma_1(x)}\right)\right)(\hat{p}_0 - q_1) \right]$$

To simplify notations, we write $Gain(x)$. To find the $x$ that maximizes $Gain(x)$, we look at its first and second derivatives.

$$\frac{d}{dx}Gain(x) =$$
$$N_0(\hat{p}_0 - q_0) + \frac{N_1\sigma_0\gamma N_0^{1/2}}{2x^{1/2}(\gamma+xN_0)^{3/2}} \phi\left(\frac{q_1-\hat{p}_0}{\sigma_1(x)}\right)$$
$$\frac{d^2}{dx^2}Gain(x) =$$
$$A(x)\left[-4N_0x^2 + \gamma(B^2-1)x + B^2\gamma^2N_0^{-1}\right],$$

where $$A(x) = \frac{N_1\sigma_0\gamma N_0^{1/2}}{4x^{5/2}(\gamma+xN_0)^{5/2}} \phi\left(\frac{q_1-\hat{p}_0}{\sigma_1(x)}\right)$$
$$B = (q_1 - \hat{p}_0)/\sigma_0.$$

We define $$C = (\gamma/8N_0)\left(B^2 - 1 + [(B^2-1)^2 + 16B^2]^{1/2}\right).$$

Note that $x = C$ is the only solution to $\frac{d^2}{dx^2} Gain(x) = 0$, for $x > 0$, if the solution exists.

PROPOSITION 3. $\frac{d}{dx} Gain(x)$ is decreasing in $x$, for $C < x < 1$. Let $x^*$ be the unique solution, if it exists, to $\frac{d}{dx} Gain(x) = 0$, for $C < x < 1$. Then, $\max_{x \in [0,1]} Gain(x)$ achieves the maximum at either $x = 0$, $x = 1$ or $x = x^*$, if $x^*$ exists.

Efficient algorithm: The optimal solution to the bayes 2×2 case is $\max_{x \in [0,1]} Gain(x)$. By Proposition 3, we only need to find $x^*$. Because $\frac{d}{dx} Gain(x)$ is decreasing, we can apply binary search to find $x^*$, which is the $x$, between $C$ and 1, such that $\frac{d}{dx} Gain(x) = 0$.

3.4 Bayes K×2: K Items, 2 Intervals

Consider that we have $K$ items (without the need to distinguish between certain ones and uncertain ones), but still have 2 intervals left. The optimal solution to this problem can be defined, but finding it is computationally hard. Thus, we apply the Lagrange relaxation technique to find a near optimal solution. While the Lagrange relaxation technique is well-known, the application of this technique to our problem setting is novel.

Recall that $p_{i,t} \sim \mathcal{P}(\theta_{i,t})$ denote the CTR of item $i$ at time $t \in \{0,1\}$. Let $\mu(\theta_{i,t}) = E[p_{i,t}]$, a function of $\theta_{i,t}$, denote the expected value of $p_{i,t}$. Let $\theta_t = [\theta_{1,t}, ..., \theta_{K,t}]$ be the joint state of all items at time $t$. Let $x_{i,t}$ be the fraction of page views to be given to item $i$ at time $t$. Our goal is to determine $x_{i,0}$ and $x_{i,1}$, for all $i$, in order to maximize the total number of clicks in the two time intervals. We use $x_t$ to denote $[x_{1,t}, ..., x_{K,t}]$. Note that, when we make this decision, $\theta_0$ is known, but $\theta_1$ is not because it depends on $x_0$ and the numbers of clicks, $c_0 = [c_{1,0}, ..., c_{K,0}]$, that the items are going to receive after the items are served according to $x_0$. Also note that, the $x_{i,0}$'s are numbers between 0 and 1, but the $x_{i,1}$'s are functions of $x_0$ and $c_0$. Assume that, for any $\theta_0$, each $(x_0, c_0)$ uniquely identifies a next state $\theta_1(x_0, c_0)$. This is true for many common models, e.g., the beta-binomial model. Thus, it is equivalent to think of $x_{i,1}$ as a function of $\theta_1(x_0, c_0)$. To emphasize this, we sometimes write $x_{i,1}(\theta_1)$.

The expected total number of clicks in the two intervals is $R(x, \theta_0, N_0, N_1) = $
$N_0 \sum_i x_{i,0} \mu(\theta_{i,0}) + N_1 \sum_i E_{\theta_1}[x_{i,1}(\theta_1) \mu(\theta_{i,1})]$.

Our goal is to find $R^*(\theta_0, N_0, N_1) = \max_{0 \leq x \leq 1} R(x, \theta_0, N_0, N_1)$, subject to
$\sum_i x_{i,0} = 1$ and $\sum_i x_{i,1}(\theta_1) = 1$, for all possible $\theta_1$.

Note that, without the above constraints, $R(x, \theta_0, N_0, N_1)$ would be maximized by setting every $x_{i,t}$ to 1.

Lagrange relaxation: To make the above optimization computationally feasible, we relax the constraints on interval 1. Instead of requiring $\sum_i x_{i,1}(\theta_1) = 1$, *for all possible* $\theta_1$, we only require $\sum_i x_{i,1}(\theta_1) = 1$ on average. Thus, the optimization problem becomes:

$R^+(\theta_0, N_0, N_1) = \max_{0 \leq x \leq 1} R(x, \theta_0, N_0, N_1)$, subject to
$\sum_i x_{i,0} = 1$ and $E_{\theta_1}[\sum_i x_{i,1}(\theta_1)] = 1$.

The Lagrange multiplier technique is a common technique to handle constrained optimization problems like this. Whittle [19] introduced Lagrange relaxation to explore/exploit problems but he did not consider batched serving. The idea is to redefine the objective function by including the constraints, and then solve the resulting unconstrained problem. We define:

$V(\theta_0, q_0, q_1, N_0, N_1) = \max_{0 \leq x \leq 1} \{ R(x, \theta_0, N_0, N_1)$
$- q_0 N_0 (\sum_i x_{i,0} - 1)$
$- q_1 N_1 (E[\sum_i x_{i,0}] - 1) \}$, where $q_0$ and $q_1$ are the Lagrange multipliers. By the theory of Lagrange multipliers, under mild regulatory conditions, $R^+(\theta_0, N_0, N_1) = \min_{q_0, q_1} V(\theta_0, q_0, q_1, N_0, N_1)$.

We then introduce two important properties of the $V$ function that significantly simplify the computation.

PROPOSITION 4. Convexity: $V(\theta_0, q_0, q_1, N_0, N_1)$ *is convex in* $(q_0, q_1)$.

Because $V$ is convex in $(q_0, q_1)$, standard non-differential convex optimization tools can be used to find the minimum solution. Now, the question is, given $(q_0, q_1)$, how to compute the $V$ function efficiently.

PROPOSITION 5. Separability: $V(\theta_0, q_0, q_1, N_0, N_1) = $ $\sum_i \left( \max_{0 \leq x_{i,0} \leq 1} Gain(x_{i,0}, \theta_{i,0}, q_0, q_1, N_0, N_1) \right) + q_0 N_0 + q_1 N_1$.

The separability property is important for efficient computation. Because of this property, to compute the $V$ function, we can do maximization (over $x_{i,0}$) for each item $i$ *independently*. This independent maximization reduces to the gain maximization discussed in Section 3.3 and can be solved efficiently. To appreciate the importance of the separability property, let us consider how to compute function $V$ without the property. In this case, we would need to do *joint* maximization (over $x_{1,0}, ..., x_{K,0}$ jointly) in a $K$-dimensional space. Even if function $V$ is concave (which may not be true) in $x_{1,0}, ..., x_{K,0}$, this joint maximization is expensive.

Near optimal solution: To decide what fraction of page views is given to each item $i$ in the next interval (interval 0), we use a standard convex optimization tool to compute $\min_{q_0, q_1} V(\theta_0, q_0, q_1, N_0, N_1)$. Let $q_0^*$ and $q_1^*$ be the minimum solution. Then, $x_{i,0}^* = \arg \max_{0 \leq x_{i,0} \leq 1} Gain(x_{i,0}, \theta_{i,0}, q_0^*, q_1^*, N_0, N_1)$ is the fraction to be given to item $i$. Studies of several related (but different) problems suggest that Lagrange relaxation usually gives near optimal solutions. As Glazebrook [6] noted, "a developing body of empirical evidence testifies to the strong performance of Whittle's index [Lagrange-relaxation based] policies ..." Deriving informative sub-optimality bound in our problem setting is future work.

3.5 General Solution

We now develop the solution for the general case, in which we have a dynamic set of items and non-stationary CTR.

Two-stage approximation for multiple intervals: Consider that we have $K$ items and $T + 1$ future intervals ($t = 0, ..., T$). We first assume that all of these $K$ items are available in every future interval. We note that, similar to the bayes K×2 case, after we apply Lagrange relaxation, the convexity and separability properties still hold (while the formulas need to be slightly modified). However, the computation complexity increases exponentially in $T$. In the interest of space, we do not provide formal statements. Because we need a scalable serving method, we approximate the $T + 1$ interval case by only considering two stages: The first stage (indexed by 0) contains interval 0 with $N_0$ page views, while the second stage (indexed by 1) contains the rest $T$ intervals with $\Sigma_{t \in [1,T]} N_t$ page views. We then treat the second stage as the second interval in the bayes 2×2 case. Thus, we obtain the approximate solution by solving the bayes 2×2 case where $N_1$ is replaced by $\Sigma_{t \in [1,T]} N_t$.

Dynamic set of items: Items in a content optimization system come and go. For example, to ensure freshness, a business rule specifies that the lifetime of each item is at most one day. Consider that we want to decide what fraction of page views should be given the each *live item* in the next interval (indexed by 0). The basic idea of our solution is to apply the two-stage approximation to each individual item such that the lifetime constraint of each item is also satisfied. The theoretical justification is that the separability property also holds if we include the lifetime constraint for each item. In the interest of space, we do not provide formal statements.

Let $start(i)$ and $end(i)$ denote the start interval and end interval of item $i$. Let $\mathcal{I}_0$ denote the set of live items, which are items $i$ with $start(i) \leq 0$. Let $T = \max_{i \in \mathcal{I}_0} end(i)$ denote the end time of the item, in $\mathcal{I}_0$, having the longest lifetime. Let $\mathcal{I}^+$ be the set of items $i$ with $1 \leq start(i) \leq T$. We call such items *future* items. For ease of exposition, let $end_T(i) = \min\{T, end(i)\}$. We extend the two-stage approximation to include item lifetime constraints by modifying the $V$ function (in Proposition 5) as follows.

$$V(\theta_0, q_0, q_1, N_0, ..., N_T) =$$
$$\sum_{i \in \mathcal{I}_0} \max_{0 \leq x_{i,0} \leq 1} Gain(x_{i,0}, \theta_{i,0}, q_0, q_1, N_0, \sum_{t=1}^{end_T(i)} N_t)$$
$$+ \sum_{i \in \mathcal{I}^+} \max_{0 \leq y_i \leq 1} Gain(y_i, \theta_{i,0}, q_1, q_1, N_{start(i)}, \sum_{t\ start(i)+1}^{end_T(i)} N_t)$$
$$+ q_0 N_0 + q_1 \sum_{t \in [1,T]} N_t.$$

We apply standard convex minimization techniques to find $q_0^*$ and $q_1^*$ that minimize the above $V$ function. The $x_{i,0}^*$ that maximizes the $Gain$ function at $q_0 = q_0^*$ and $q_1 = q_1^*$ is the fraction of page views to be given to item $i$ in the next time interval. We now explain the above $V$ function:

- *Live items vs. future items*: Live items ($\mathcal{I}_0$) requires a different treatment from future items ($\mathcal{I}^+$). Thus, there are two separate summation terms. For each item, we apply the two-stage approximation. For a live item $i$, interval 0 is the first stage, while the second stage includes intervals 1, ..., $end_T(i)$. For a future item $i$, the first stage is $start(i) \neq 0$, and the second stage includes intervals $start(i) + 1, ..., end_T(i)$. Recall that our goal is to determine what fraction $x_{i,0}$ of page views should be given to each live item $i$ in the immediate next interval (interval 0). So, we use a different variable, i.e., $y_i$, to denote the first-stage decision for future item $i$, which enters the system later than interval 0.

- *Lagrange multipliers*: $q_0$ is used to ensure that $\sum_{i \in \mathcal{I}_0} x_{i,0} = 1$, for live items. Because future items are not available in interval 0, their gains do not include $q_0$. $q_1$ is used to ensure that "the expected total number of page views given to items between interval 1 and $T$ in our optimization" matches the actual number of page views (i.e., $\sum_{t \in [1,T]} N_t$). Thus, $q_1$ is in both gain functions. Note that, in the gain function for future items, we have two occurrences of $q_1$ because both stages for future items are between interval 1 and $T$.

- *Item lifetime*: $N_0, \sum_{t=1}^{end_T(i)} N_t$ (in the gain function of live items) and $N_{start(i)}, \sum_{t\ start(i)+1}^{end_T(i)} N_t$ (in the gain function of future items) incorporate item lifetimes into the optimization.

- *Prior distribution*: $\theta_{i,0}$ represents our current belief about the CTR of item $i$. For live items, $\theta_{i,0}$ is the current state, which has been updated by all of the observed clicks in the past. For future items, we have no observation. Thus, $\theta_{i,0}$ is estimated (or initialized) based on analysis on historical data.

Non-stationary CTR: Our approach to non-stationary CTR is by using dynamic models. When we update the state from $\theta_{i,t}$ to $\theta_{i,t+1}$ after observing $c_{i,t}$ clicks in $x_{i,t} N_t$ page views, instead of assuming that the CTRs of item $i$ at time $t$ and $t + 1$ are the same, we allow them to have small changes. Time-series filters (e.g., the Kalman filter) are examples of dynamic models that allow CTR changes. In general, they can be used in our framework, but would also introduce additional complexity.

In this paper, we only consider the exponentially weighted Beta-Binomial (EWBB) and Gamma-Poisson (EWGP) models for handling non-stationary CTR. A study of other dynamic models (e.g., models in [18]) is future work. Assume CTR $p_{i,t} \sim Beta(\alpha, \gamma)$ or $Gamma(\alpha, \gamma)$; i.e., $\theta_{i,t} = [\alpha, \gamma]$, where $\alpha$ and $\gamma$ can be thought of as the number of clicks and the number of views that we saw in the past for item $i$. After observing $c$ clicks in $v$ page views, if CTR does not change over time, we update the state by $\theta_{i,t+1} = [\alpha + c, \gamma + v]$.

The EWBB and EWGP models are simple. Let $0 \leq w \leq 1$ be a user-specified weight (which needs to be tuned). We update the state by $\theta_{i,t+1} = [w\alpha + c, w\gamma + v]$. If we set $w = 0$, we track instant CTR by ignoring all the past observations. This is an unbiased estimate of the current state, but the variance (uncertainty) would be large (unless we give the item a large number of page views in time $t$). If we set $w = 1$, we basically assume stationary CTR. In this case, although variance is reduced by using all the past observations, the estimate of current state is biased toward the past.

A good $w$ value needs to be found based on application-specific characteristics and analysis of historical data. The difference between EWBB and EWGP is in the way that the variance is computed.

Using the EWBB/EWGP model in our Bayesian framework is also simple. For each interval, after observing users' actual clicks, we use the EWBB/EWGP model to update the state of each item. Also, in the gain function computation in the bayes 2×2 case (which is used in the two-stage approximation for the general case), we down-weight $\alpha$ and $\gamma$ in the second interval by $w$. Specifically, in the normal approximation, we just need to redefine:

$$Var[\hat{p}_1(x,c)] = \sigma_1(x)^2 \equiv \frac{xN_0}{w\gamma + xN_0}\sigma_{0w}^2,$$

where $\sigma_{0w}^2 = \frac{\alpha(\gamma-\alpha)}{\gamma^2(1+w\gamma)}$ for EWBB and $\sigma_{0w}^2 = \frac{\alpha}{w\gamma^2}$ for EWGP.

3.6 Bayes solution for Personalization

We derived a Bayes optimal solution (BOS) assuming a separate tracking model per item that tracks overall item CTR through time. We now consider a scenario where CTR of an item depends on other characteristics of page view (e.g. user features based on age, gender, geo, browse behavior,etc). Note that BOS works for any subpopulation of page views with large enough sample size at each time interval. With small amounts of traffic per interval, we expand the size of the time interval (e.g. from 5 minutes to an hour) when calculating the sampling plan through BOS (serving can still happen at a finer time resolution). If the page view characteristics can be captured sufficiently well through disjoint user segments, the BOS can be run separately in each segment. In many applications, the relationship between item CTRs and impression characteristics are given by a feature based model (e.g. logistic regression). We describe an approximate solution below.

Consider the following setup where $z_{ij}$ denotes feature vector for item $j$ and page view of type $i$. Let $p(z_{ij}, \theta_j)$ denote the CTR for item $j$ which is a function of unknown parameter $\theta_j$. Given the posterior distribution of $\theta_j$, we fit a beta distribution to match the mean and variance of $p(z_{ij}, \theta_j)$. The optimal solution is now directly obtained through BOS. However, since BOS is expensive to compute at runtime, we precompute the solutions for each feature vector $z_i$. The occurence distribution of these vectors is computed offline from historic data. For feature vectors with small probability of occurence in a 5-min interval, we expand the time horizon to include a minimum number of impressions. We also cluster the feature vectors into several segments and serve according to a segmented solution for rare page view types that do not occur in the historic data.

3.7 Sample size calculation for multiple experiments

Other than explore-exploit solutions to facilitate serving for some predefined segments, we also want to run targeted experiments with pre-calculated sample sizes on some user segments during some time periods. We refer to these as *micro experiments*. For instance, an offline analysis may reveal a potential CTR hotspot for an item when served to old male users logging-in from Puerto-Rico and interested in Music. We may want to investigate such a hotspot rapidly through an online experiment. In a scenario where we are running multiple experiments that potentially compete for the same page view types, one can reduce the sample size required to perform experimentation through a simple flow based optimization. In particular, let $s_1, \cdots, s_l$ be $l$ different page view types(sources) that can supply to experiments $e_1, .., e_m$ (sinks). We assume the experiments are independent of each other, i.e., information gain in one experiment does not add any additional information to others. The supply on sources and demands on sinks are known. Let $w_{ij}$ denote the number of page view supplied by source $s_i$ to sink $e_j$. Our goal is to obtain $w_{ij}$'s so that we mimimize $\sum_{ij} w_{ij}$ subject to supply and demand constraints. In case the solution is infeasible, we reduce the demand of experiments that cause the infeasibility.

4. FREQUENTIST'S SOLUTIONS

Many frequentist's solutions to the multi-armed bandit problem can be applied or adapted to our problem setting. Vermorel and Mohri [16] compared many such solutions in the context of the regular multi-armed bandit problem. In this section, we describe several baseline methods as well as a simple, novel adaptation of priority-based methods (e.g., UCB schemes) to our problem setting.

We call an item $i^*$ the EMP (estimated most popular) item at time $t$ if it has the highest estimated CTR; i.e., $E[p_{i^*,t}] = \max_i E[p_{i,t}]$. We use $\hat{p}_{i,t}$ to denote $E[p_{i,t}]$, which is the output of a dynamic model that predicts the CTR of item $i$ at time $t$.

4.1 Randomization-Based Schemes

Vermorel and Mohri [16] found that the most naive approach, in which we use a small fraction of page views for random exploration and serve the rest of page views with the EMP item, performed remarkably well. In the following, we describe such an approach and its variants.

$\epsilon$-Greedy: The simplest serving scheme is to explore each item using a fixed fraction of page views in a uniformly random manner. For each time interval $t$, we always serve $100(1-\epsilon)\%$ page views with the EMP item and serve $(100\epsilon)/|\mathcal{I}_t|$ percent page views with item $i$, for each $i \in \mathcal{I}_t$. Here, $\epsilon$ may need to be tuned using historical data.

$\epsilon_{i,t}$-Greedy: Auer et al. [1] provided a better randomization method called $\epsilon_n$-greedy, which has good theoretical properties and has been shown to be hard to beat [16] for the regular multi-armed bandit problem. The idea is that the amount of random exploration shrinks at a rate of $1/n$, where $n$ is the total number of observations we have so far. We adapt their method to our setting as follows. Let $n_{i,t-1}$ be the total number of page views that item $i$ has received before interval $t$. We define $\epsilon_{i,t} = min\{a, b/n_{i,t-1}\}$, where $a$ and $b$ need to be tuned based on historical data. For each interval $t$, we serve $100(1 - \Sigma_i \epsilon_{i,t})\%$ page views with the EMP item, and serve $100\epsilon_{i,t}\%$ page views with each non-EMP item $i$.

Exp3: Auer et al. [2] studied an extension of the multi-armed bandit problem, where (in our terminology) the CTRs of items can change arbitrarily over time, and proposed a "soft-max" based method called Exp3. In the following, we adapt Exp3 to batched serving with a dynamic set of items. The adaptation is straightforward. Let $G_i$ denote the total number of "adjusted" clicks that item $i$ has received so far. Initially, $G_i = 0$, for all $i$. Let $\epsilon \in (0,1]$ and $\eta > 0$ be two tuning parameters. For each time interval $t$, do the following:

1. Give item $i$ fraction $x_{i,t}$ of the page views in interval $t$, where $x_{i,t} = (1-\epsilon)r_{i,t} + \epsilon/|\mathcal{I}_t|$ and
$$r_{i,t} = \frac{\exp(\eta G_i)}{\sum_{j \in \mathcal{I}_t} \exp(\eta G_j)}.$$

2. At the end of interval $t$, assuming item $i$ receives $c_{i,t}$ clicks, update $G_i$ as follows: $G_i = G_i + c_{i,t}/x_{i,t}$.

4.2 Priority-Based Schemes

In addition to randomization-based schemes, another popular class of scheme for the multi-armed bandit problem is based on a priority function. Consider the one-at-a-time (not batched) serving setting. Intuitively, each time when we need to decide which item to show, we compute the priority function for each item and then show the item with the highest priority. In the following, we first describe a naive *winner-takes-all* (WTA) adaptation of one-at-a-time methods to batched serving, and then propose a better adaptation based on *hypothetical runs*. By winner-takes-all, we mean that the serving scheme always shows the item with the highest priority to 100% page views in any interval. By hypothetical run, we mean that, before actual serving, we go through each future page view (in the next interval) and hypothetically serve each page view with the item having the highest "simulated" priority. Then, the fraction of page views to be given to item $i$ is proportional to the number of times when $i$ is served in the hypothetical run.

WTA-UCB1: One popular class of priority function is based on upper confidence bounds (UCB). Auer et al. [1] proposed several UCB-based methods, among which UCB1 is probably the most frequently referred one. Here, we describe a naive adaptation of UCB1, in a winner-takes-all manner, to our problem setting. Consider that we want to determine what item to show in interval $t$.

- If item $i \in \mathcal{I}_t$ is a new item that we have not explored, we serve 100% page views in interval $t$ with item $i$.

- Otherwise, every item $i \in \mathcal{I}_t$ has been explored before. Then, we serve 100% page views in interval $t$ with item $i$ that maximizes $\hat{p}_{i,t} + \sqrt{\frac{2\ln n}{n_i}}$, where $n_i$ is the total number of page views that $i$ has ever received so far, and $n = \sum_{j \in \mathcal{I}_t} n_j$.

WTA-POKER: We now provide a naive winner-takes-all adaptation of the POKER method [16], which has been empirically shown to outperform many other methods. Consider interval $t$. Without loss of generality, let $\hat{p}_{i,t}$ denote the estimated CTR of the item having the $i$th highest estimated CTR. For example, $\hat{p}_{1,t}$ is the CTR of the EMP item. Then, We serve 100% page views with the item $i$ that maximizes:

$$\hat{p}_{i,t} + \Pr(p_{i,t} \geq \hat{p}_{1,t} + \delta) \delta H,$$

where $\delta = (\hat{p}_{1,t} - \hat{p}_{\sqrt{|\mathcal{I}_t|},t})/\sqrt{|\mathcal{I}_t|}$ and $H$ is a tuning parameter. The probability is computed by assuming $p_{i,t} \sim \mathcal{N}(\hat{p}_{i,t}, \hat{\sigma}_{i,t}^2)$, where $\hat{p}_{i,t}, \hat{\sigma}_{i,t}^2$ are the outputs of a dynamic model.

Batched-UCB1 (or B-UCB1): We adapt the UCB1 method by hypothetical runs as follows. Let $n_i$ denote the exponentially weighted total number of page views that $i$ has received since its release. Initially, $n_i = 0$, for all $i$. For each interval $t$, do the following:

1. Initialize $m_{i,t} = 0$, for each $i \in \mathcal{I}_t$, which represents the number of times that item $i$ is picked in the hypothetical run.

2. Do the hypothetical run. For $k = 1$ to $N_t$, do the following:

(a) Pick item $i^*$ that maximizes $\hat{p}_{i,t} + \sqrt{\frac{2\ln n}{n_i}}$, where $n = \sum_{j \in \mathcal{I}_t} n_j$.

(b) Update the counters: $n$++; $n_{i^*}$++; $m_{i^*,t}$++.

3. Define $x_{i,t} = m_{i,t}/N_t$, for each $i \in \mathcal{I}_t$.

4. Actually serve $100 x_{i,t}$% page views with item $i$ in interval $t$.

5. At the end of interval, update $n_i$ by $n_i = w n_i + x_{i,t} N_t$.

Note that $\hat{p}_{i,t}$ is estimated by the EWBB/EWGP model described in Section 3.5 and the above $w$ is the same weight factor used in the EWBB/EWGP model. Also, in the above algorithm, we assume that $\hat{p}_{i,t}$ does not change within interval $t$.

B-UCB-Beta/Gamma: UCB1 works without any assumption about the distribution of $p_{i,t}$. However, the convergence of UCB1 is usually slower than the case where we know and can use the class of distribution of $p_{i,t}$. Here, we consider a Beta-Binomial setting. Assume $p_{i,t} \sim Beta(\alpha_{i,t}, \gamma_{i,t})$ or $Gamma(\alpha_{i,t}, \gamma_{i,t})$, where $\alpha_{i,t}$ and $\gamma_{i,t}$ can be determined by the EWBB/EWGP model. Or, in the case of other kinds of models, let $\hat{p}_{i,t}$ and $\hat{\sigma}_{i,t}^2$ be the model's estimate of the mean and variance of $p_{i,t}$. Then, we can obtain (approximate) the corresponding $\alpha_{i,t}$ and $\gamma_{i,t}$ by the following formula: $\alpha_{i,t} = \hat{p}_{i,t} \gamma_{i,t}$, $$\gamma_{i,t} = \hat{p}_{i,t}(1-\hat{p}_{i,t})/\hat{\sigma}_{i,t}^2 - 1 \quad \text{for Beta}$$
$$\gamma_{i,t} = \hat{p}_{i,t}/\hat{\sigma}_{i,t}^2 \quad \text{for Gamma}$$

Also assume that the posterior mean of $p_{i,t}$ does not change in interval $t$. After we observe $m_{i,t}$ page views, the posterior distribution of $p_{i,t}$ is $Beta/Gamma(\alpha_{i,t} + m_{i,t}\hat{p}_{i,t}, \gamma_{i,t} + m_{i,t})$, where $\hat{p}_{i,t} = \alpha_{i,t}/\gamma_{i,t}$. Let $UCB(\alpha, \gamma, C)$ be the $C$% upper confidence bound of $Beta/Gamma(\alpha, \gamma)$. Then, B-UCB-Beta/Gamma works as follows: We follow the B-UCB1 procedure, but replace Step 2(a) and Step 2(b) with the following.

- Step 2(a): Pick item $i^*$ that maximizes $$\hat{p}_{i,t} + UCB(\alpha_{i,t} + m_{i,t}\hat{p}_{i,t}, \gamma_{i,t} + m_{i,t}, C).$$

- Step 2(b): Increase $m_{i^*,t}$ by 1.

Note that $C$ is a tuning parameter that needs to be determined by using tuning data.

B-POKER-Beta/Gamma: The POKER method can also be adapted in a similar manner. Assume $p_{i,t} \sim Beta/Gamma(\alpha_{i,t}, \gamma_{i,t})$. Let $UP(z; \alpha, \gamma) = \Pr(Y \geq z)$, where $Y \sim Beta/Gamma(\alpha, \gamma)$. Also assume that $\hat{p}_{i,t}$ does not change in interval $t$. Then, B-POKER-Beta/Gamma works as follows: We follow the B-UCB1 procedure, but replace Step 2(a) and Step 2(b) with the following.

- Step 2(a): Pick item $i^*$ that maximizes $\hat{p}_{i,t} + UP(\hat{p}_{1,t} + \delta;\ \alpha_{i,t} + m_{i,t}\hat{p}_{i,t},\ \gamma_{i,t} + m_{i,t})\delta H,$ where $\delta = (\hat{p}_{1,t} - \hat{p}_{\sqrt{\tau_t|,t}})/\sqrt{|\mathcal{I}_t|}$ and $H$ is a tuning parameter.

- Step 2(b): Increase $m_{i^*,t}$ by 1.

What is claimed is:

1. A computer-implemented method for automatically selecting one or more advertisements to include in a web page, comprising:
conducting one or more experiments using a computer simulation simulating a specified future time period;
wherein each of the one or more experiments involves:
hypothetically presenting at least one advertisement, from a plurality of available advertisements, in the web page, and
predicting, based, at least in part, on historical data, user interaction of a hypothetical user with the at least one advertisement;
based on the predicted user interaction, automatically selecting the one or more advertisements to present in the web page; and
in response to selecting the one or more advertisements to present in the web page, presenting the one or more advertisements in the web page;
wherein the method is performed by one or more computing devices.

2. The computer-implemented method of claim 1, wherein presenting the one or more advertisements in the web page is performed during the specified future time period.

3. The computer-implemented method of claim 2 wherein:
a particular experiment of said one or more experiments relates to a particular advertisement of said at least one advertisement;
each advertisement of the plurality of available advertisements is associated with a probability distribution of a plurality of probability distributions;
a probability distribution reflects user interaction with a related advertisement; and
a probability distribution changes over time.

4. The computer-implemented method of claim 3 wherein the particular experiment indicates a possibility that a dynamic performance metric for the particular advertisement will improve.

5. The computer-implemented method of claim 4 wherein the dynamic performance metric comprises one or more of: a click-through rate, a total number of page views over time, or a measure of overall user experience.

6. The computer-implemented method of claim 1 wherein selecting the one or more advertisements to present in the web page comprises selecting one or more advertisements of the plurality of available advertisements that will maximize a dynamic performance metric for the web page.

7. The computer-implemented method of claim 1
wherein the historical data comprises a number of times each advertisement of the plurality of available advertisements has been viewed by a user of a plurality of users and a number of times each advertisement of the plurality of available advertisements has been selected by a user of the plurality of users.

8. The computer-implemented method of claim 1 wherein the plurality of available advertisements is changeable.

9. The computer-implemented method of claim 1 further comprising the steps of:
estimating a current value of a performance metric for a particular advertisement of the one or more advertisements;
estimating a probability of improvement of the current value; and
basing a percentage of future page views to dedicate to the particular advertisement on the probability of improvement of the current value.

10. A non-transitory computer-readable storage medium storing instructions for automatically selecting one or more advertisements to include in a web page, which instructions, when executed by one or more processors, cause performance of the steps of:
conducting one or more experiments using a computer simulation simulating a specified future time period;
wherein each of the one or more experiments involves:
hypothetically presenting at least one advertisement, from a plurality of available advertisements, in the web page, and
predicting, based, at least in part, on historical data, user interaction of a hypothetical user with the at least one advertisement;
based on the predicted user interaction, automatically selecting the one or more advertisements to present in the web page; and
in response to selecting the one or more advertisements to present in the web page, presenting the one or more advertisements in the web page.

11. The non-transitory computer-readable storage medium of claim 10, wherein presenting the one or more advertisements in the web page is performed during the specified future time period.

12. The non-transitory computer-readable storage medium of claim 11 wherein:
a particular experiment of said one or more experiments relates to a particular advertisement of said at least one advertisement;
each advertisement of the plurality of available advertisements is associated with a probability distribution of a plurality of probability distributions;
a probability distribution reflects user interaction with a related advertisement; and
a probability distribution changes over time.

13. The non-transitory computer-readable storage medium of claim 12 wherein the particular experiment indicates a possibility that a dynamic performance metric for the particular advertisement will improve.

14. The non-transitory computer-readable storage medium of claim 13 wherein the dynamic performance metric comprises one or more of: a click-through rate, a total number of page views over time, or a measure of overall user experience.

15. The non-transitory computer-readable storage medium of claim 10 wherein selecting the one or more advertisements to present in the web page comprises selecting one or more advertisements of the plurality of available advertisements that will maximize a dynamic performance metric for the web page.

16. The non-transitory computer-readable storage medium of claim 10 wherein the historical data comprises a number of times each advertisement of the plurality of available advertisements has been viewed by a user of a plurality of users and a number of times each advertisement of the plurality of available advertisements has been selected by a user of the plurality of users.

17. The non-transitory computer-readable storage medium of claim 10 wherein the plurality of available advertisements is changeable.

18. The non-transitory computer-readable storage medium of claim 10 further comprising instructions for the steps of:
estimating a current value of a performance metric for a particular advertisement of the one or more advertisements;
estimating a probability of improvement of the current value; and basing a percentage of future page views to dedicate to the particular advertisement on the probability of improvement of the current value.

\* \* \* \* \*